Aug. 16, 1949.　　　E. W. HOLMES ET AL　　　2,479,009
WRECKER AND SIMILAR HOISTING APPARATUS
Filed Dec. 28, 1944　　　　　　　　　　15 Sheets-Sheet 1
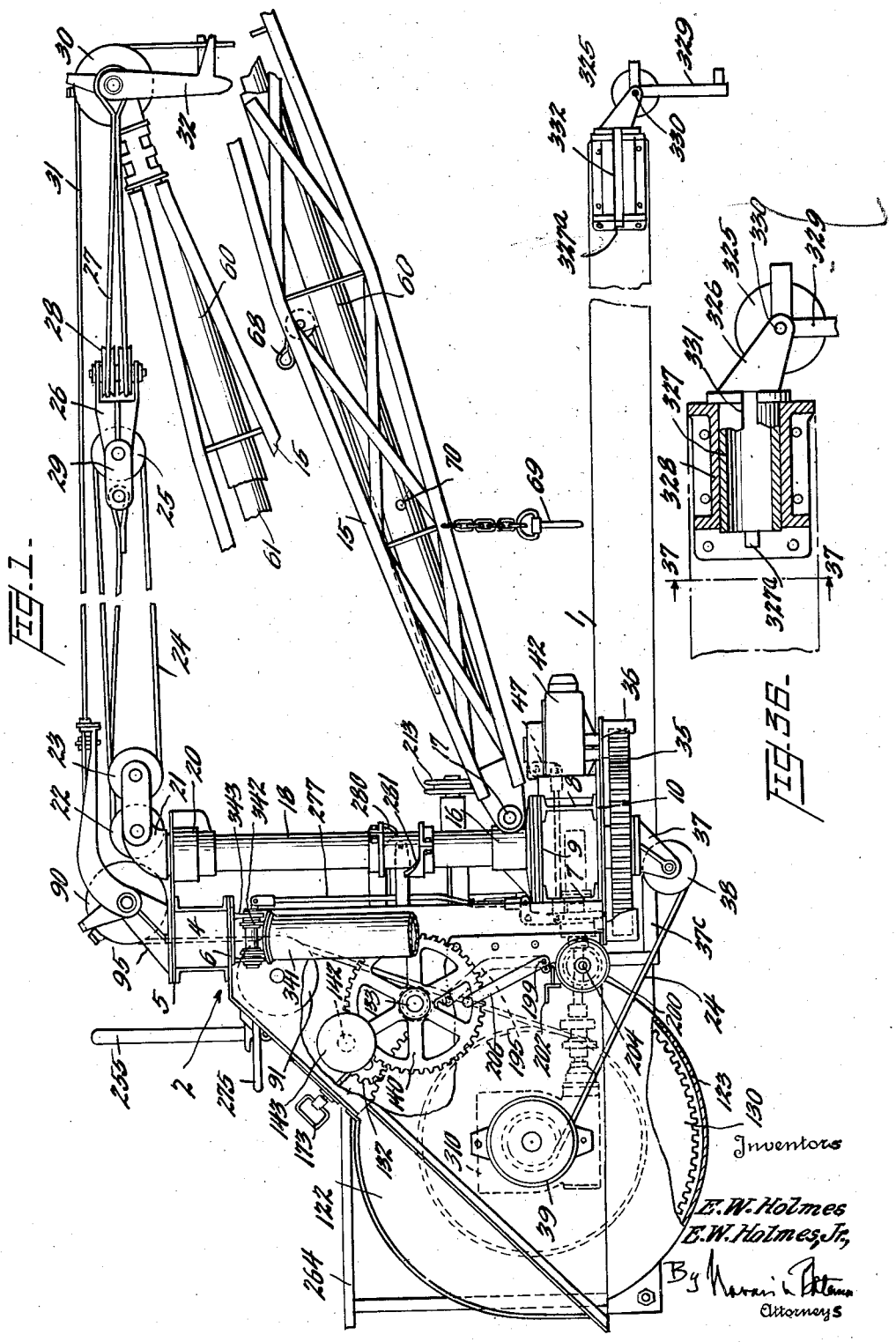
Inventors
E. W. Holmes
E. W. Holmes, Jr.
By
Attorneys

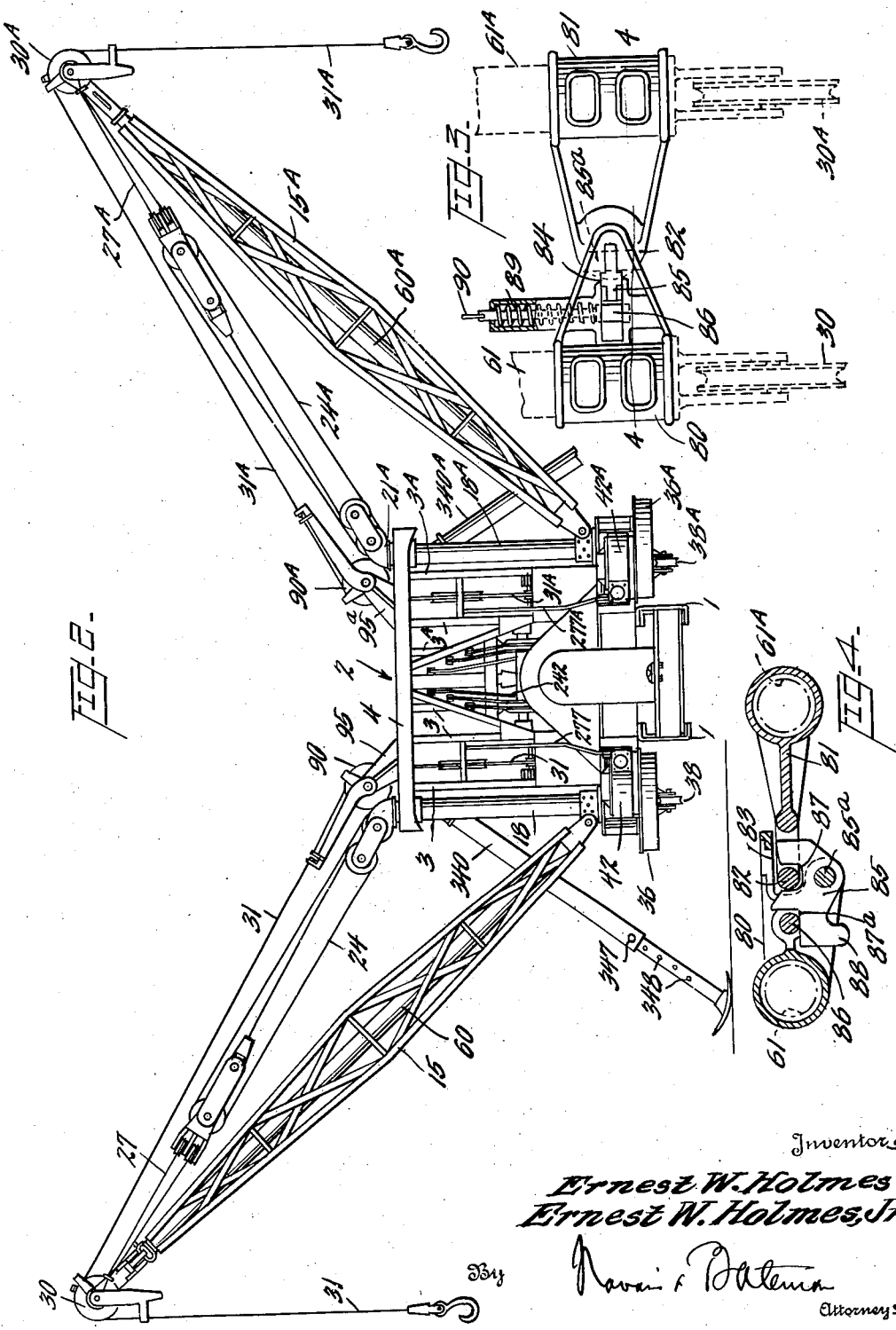

Aug. 16, 1949.  E. W. HOLMES ET AL  2,479,009
WRECKER AND SIMILAR HOISTING APPARATUS
Filed Dec. 28, 1944  15 Sheets-Sheet 3
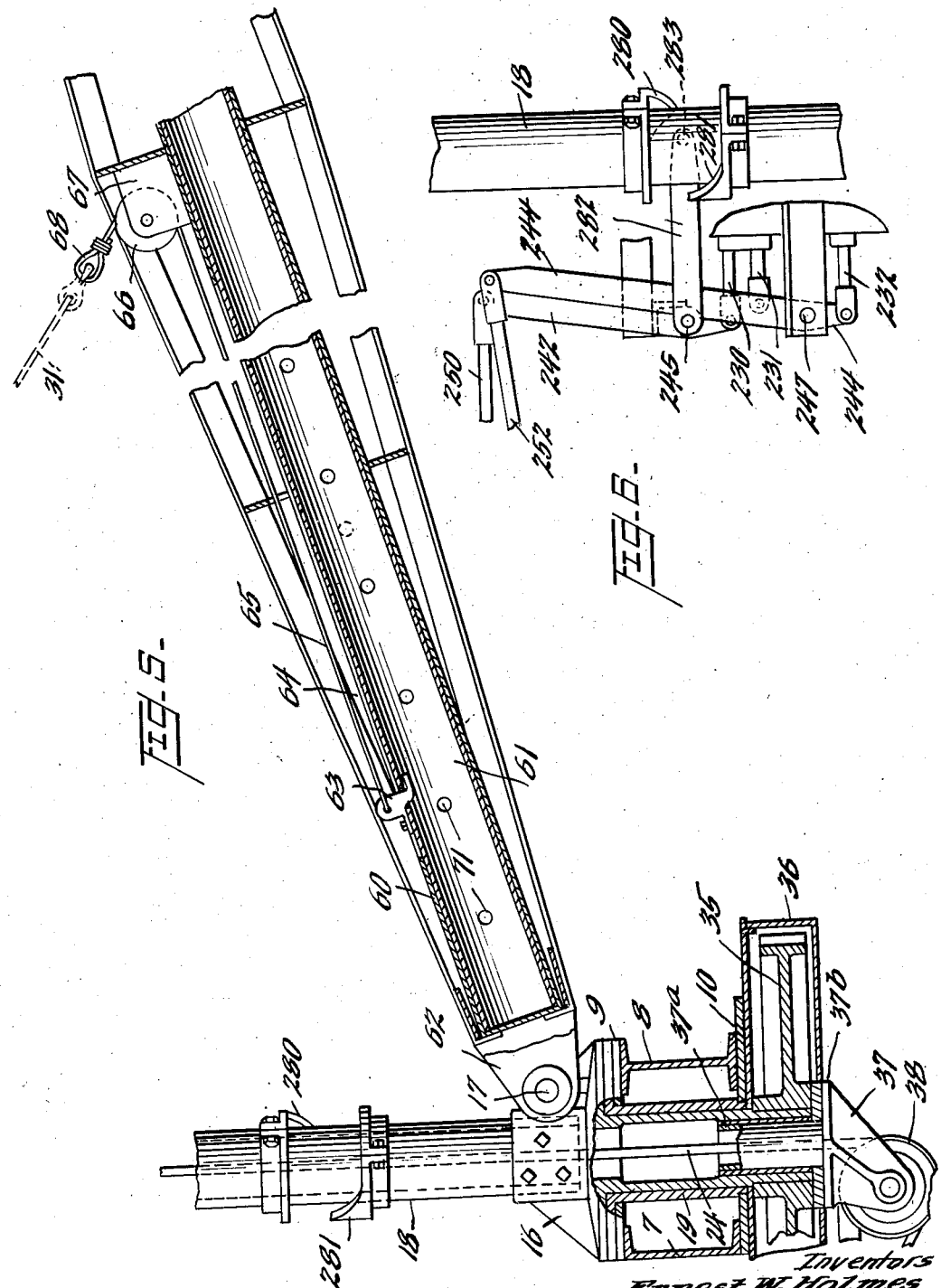

Aug. 16, 1949.   E. W. HOLMES ET AL   2,479,009
WRECKER AND SIMILAR HOISTING APPARATUS
Filed Dec. 28, 1944   15 Sheets-Sheet 4
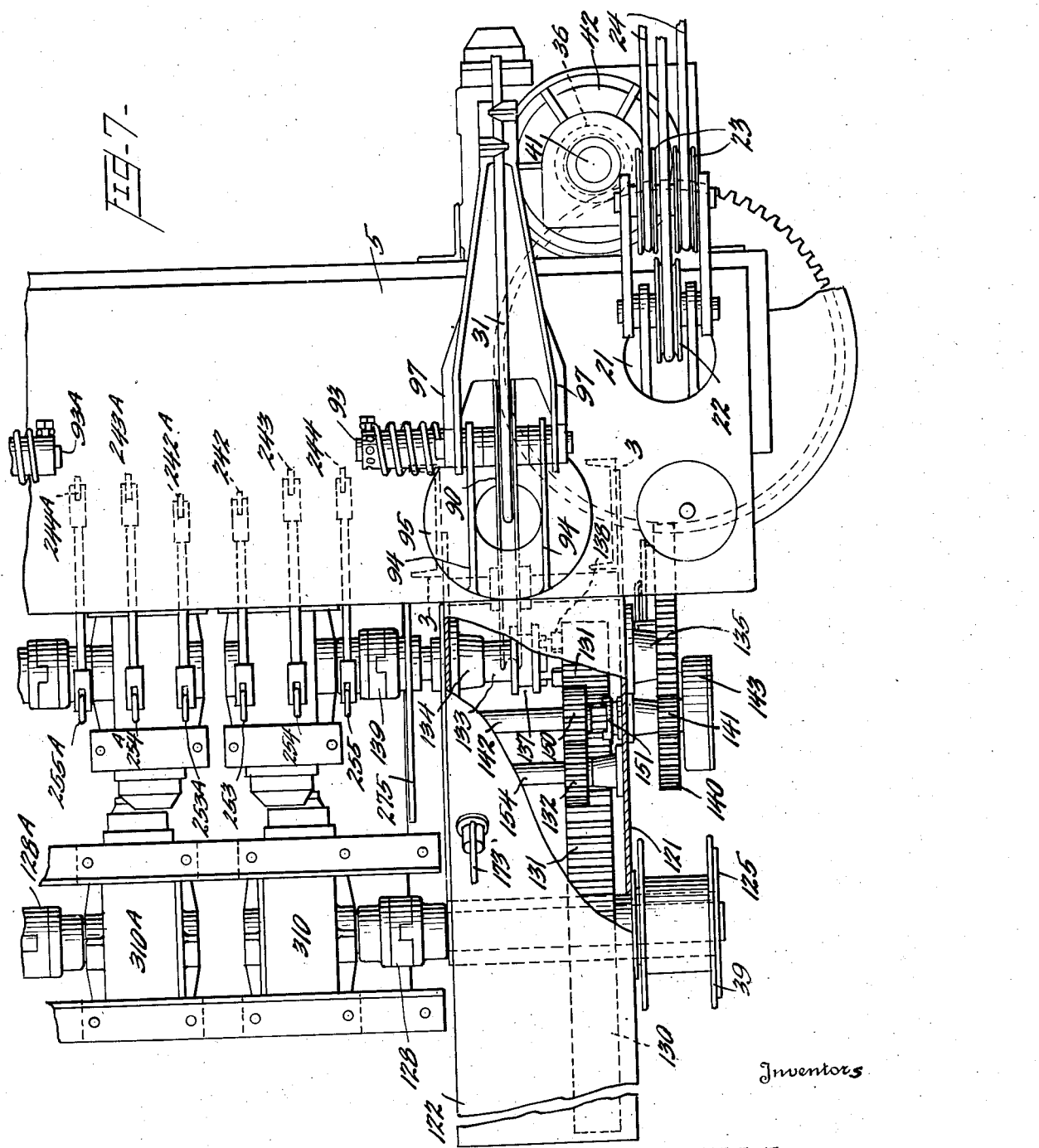

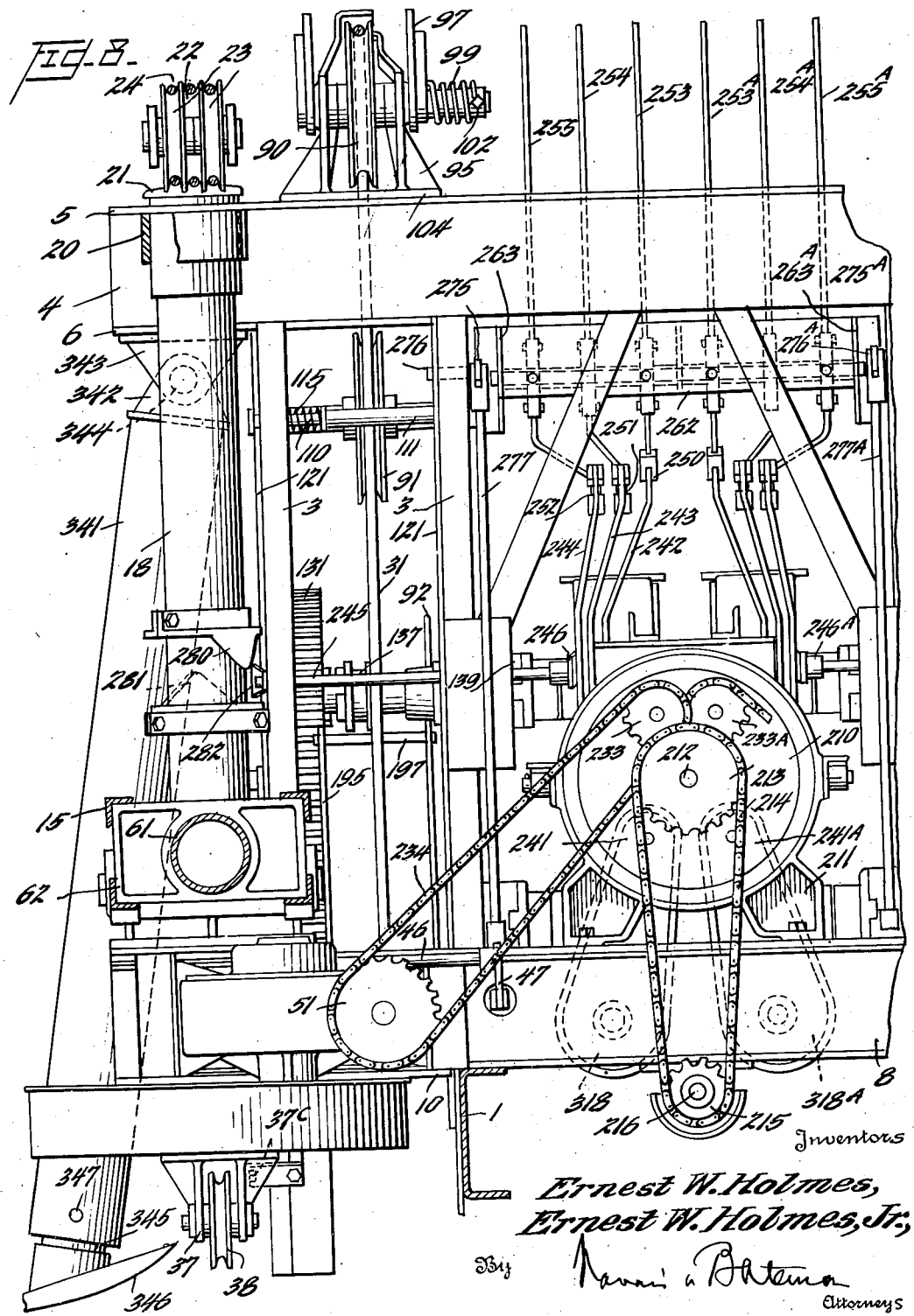

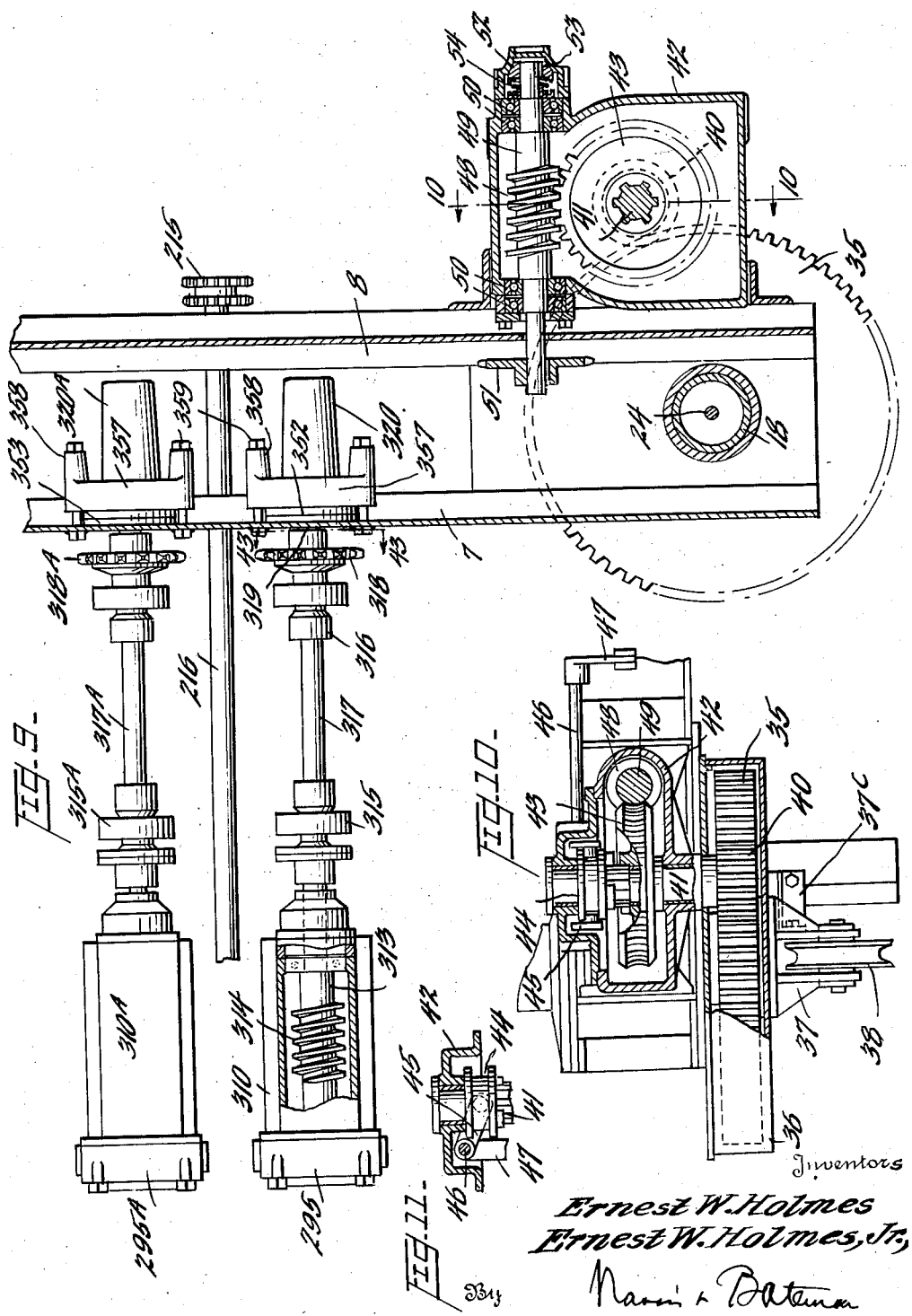

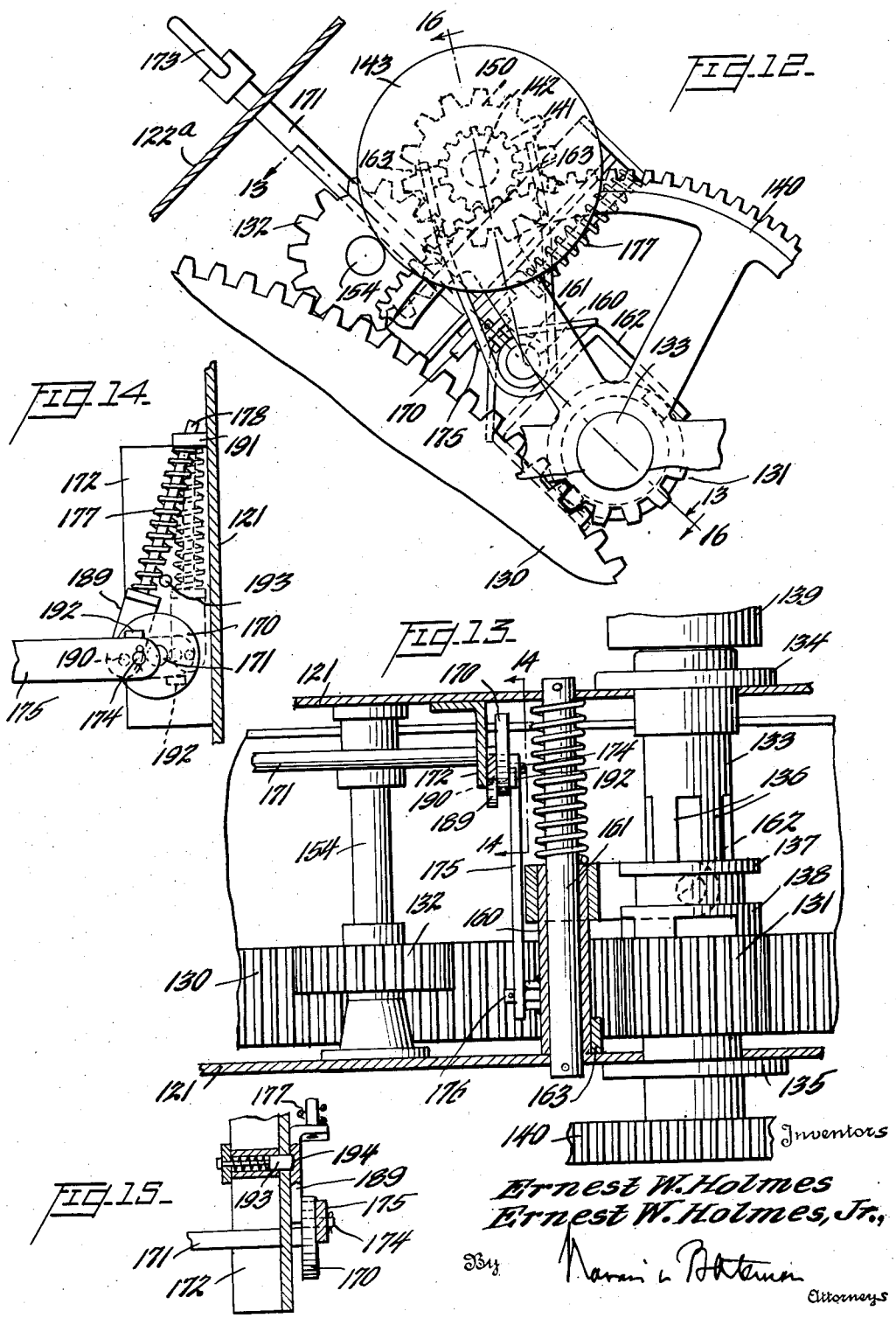

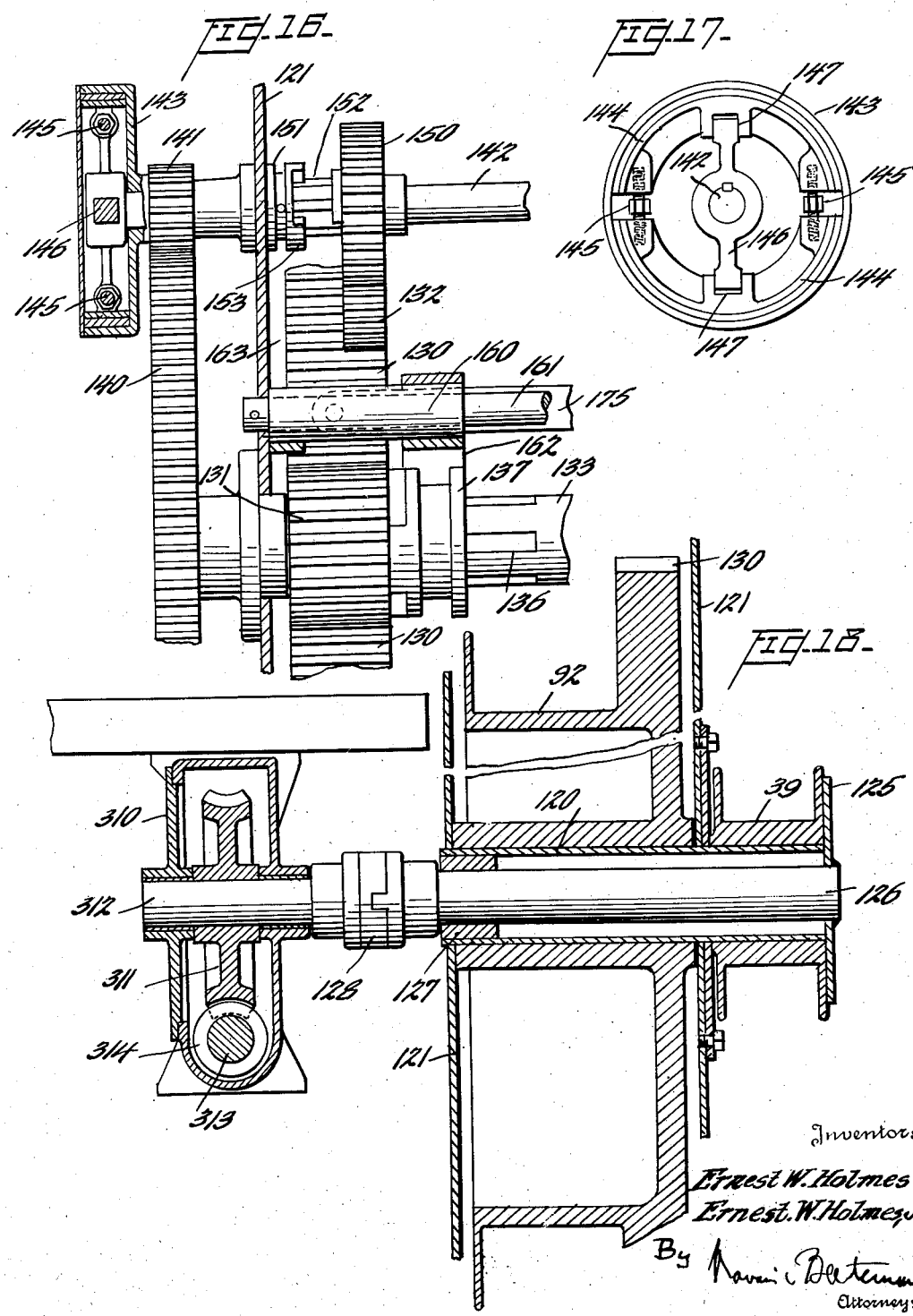

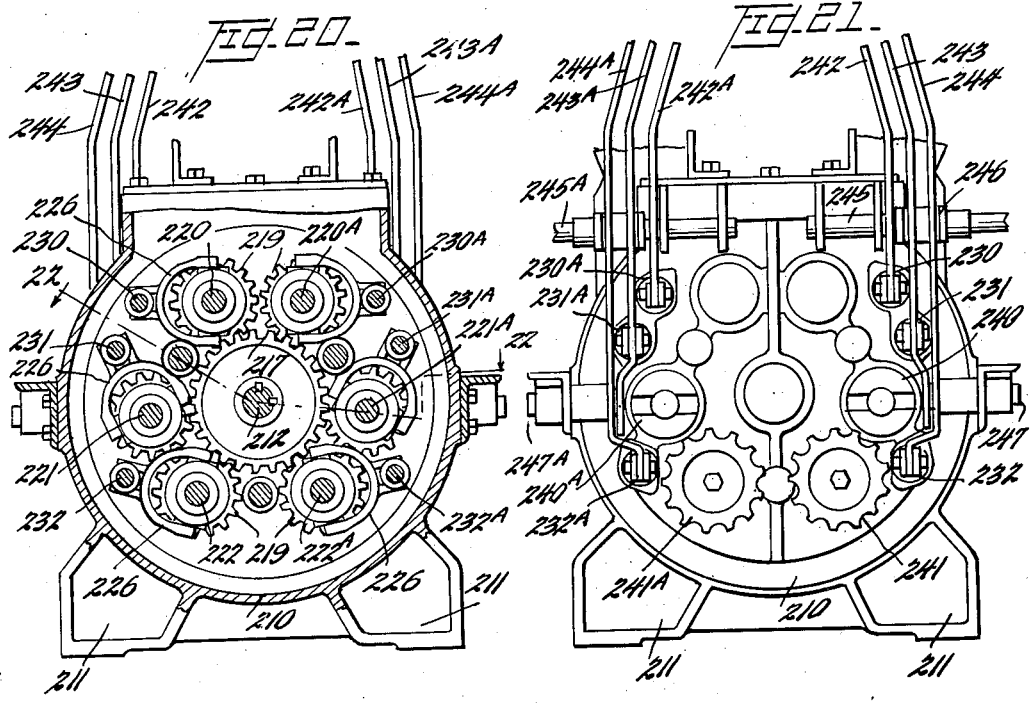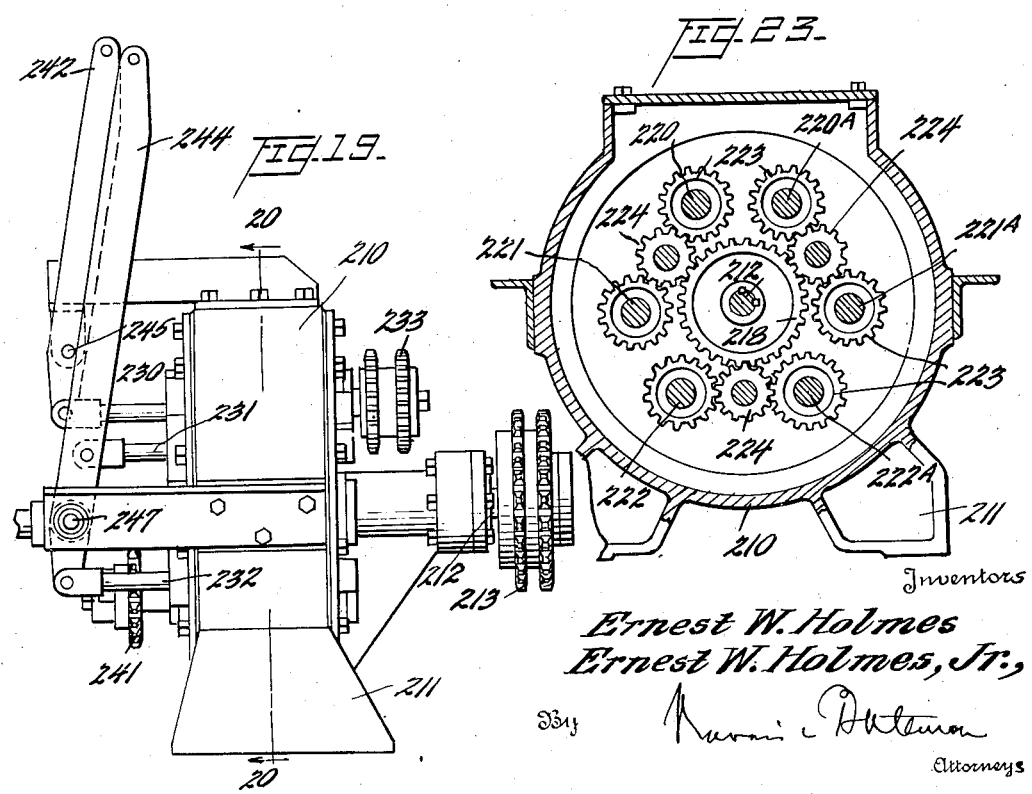

Aug. 16, 1949.  E. W. HOLMES ET AL  2,479,009
WRECKER AND SIMILAR HOISTING APPARATUS
Filed Dec. 28, 1944  15 Sheets-Sheet 10
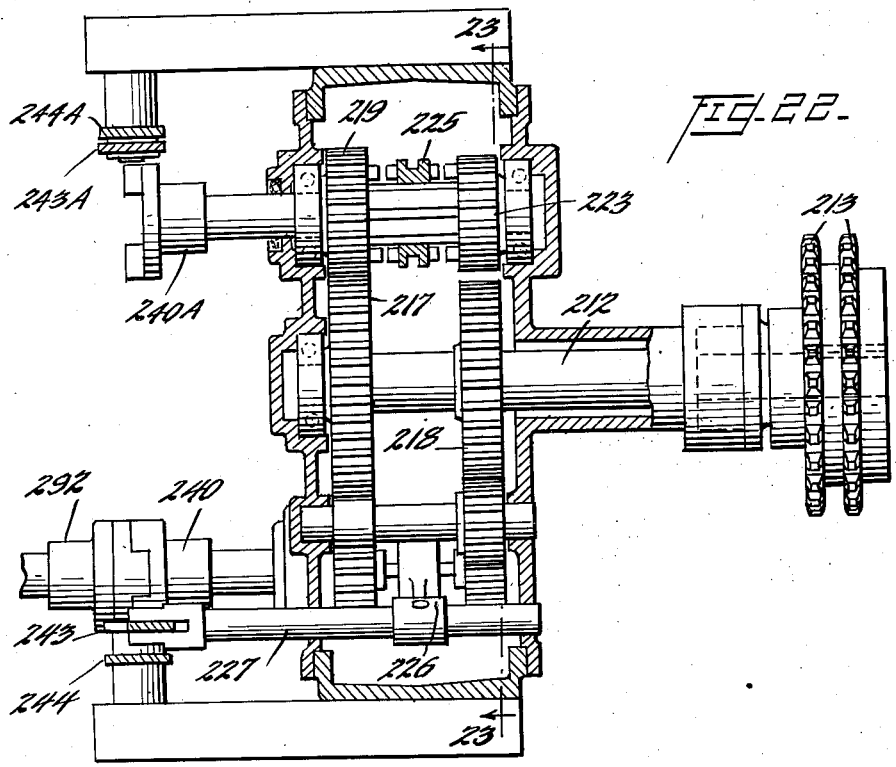
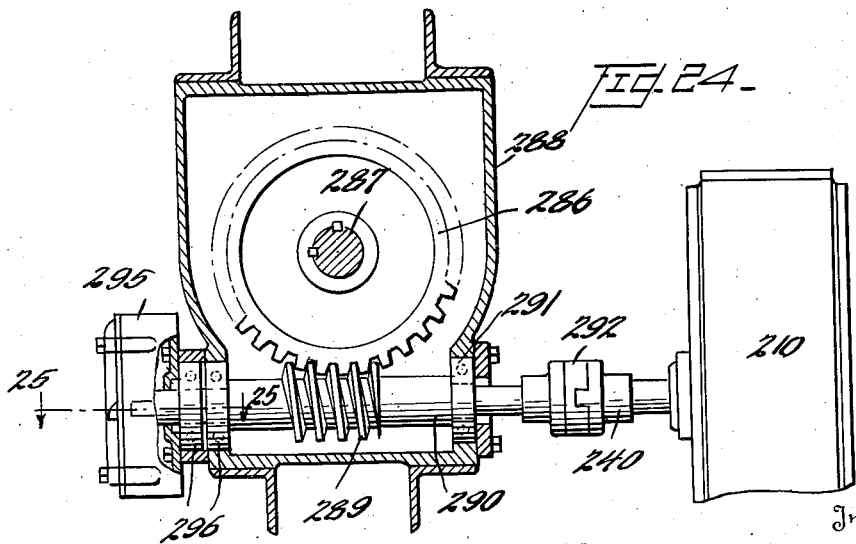
Inventors
Ernest W. Holmes
Ernest W. Holmes, Jr.,
By
Attorneys

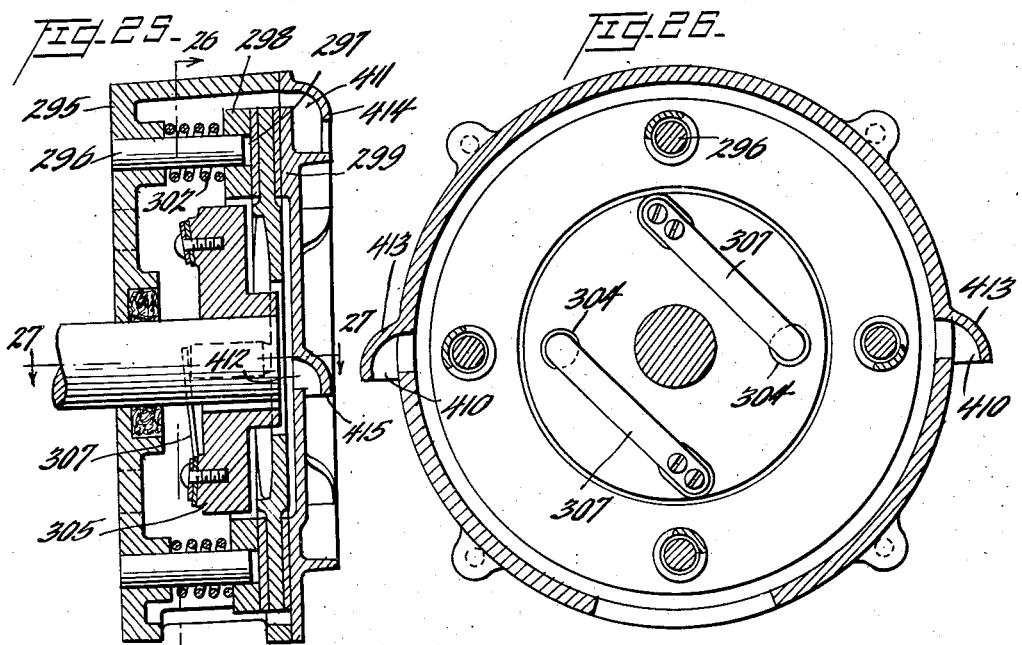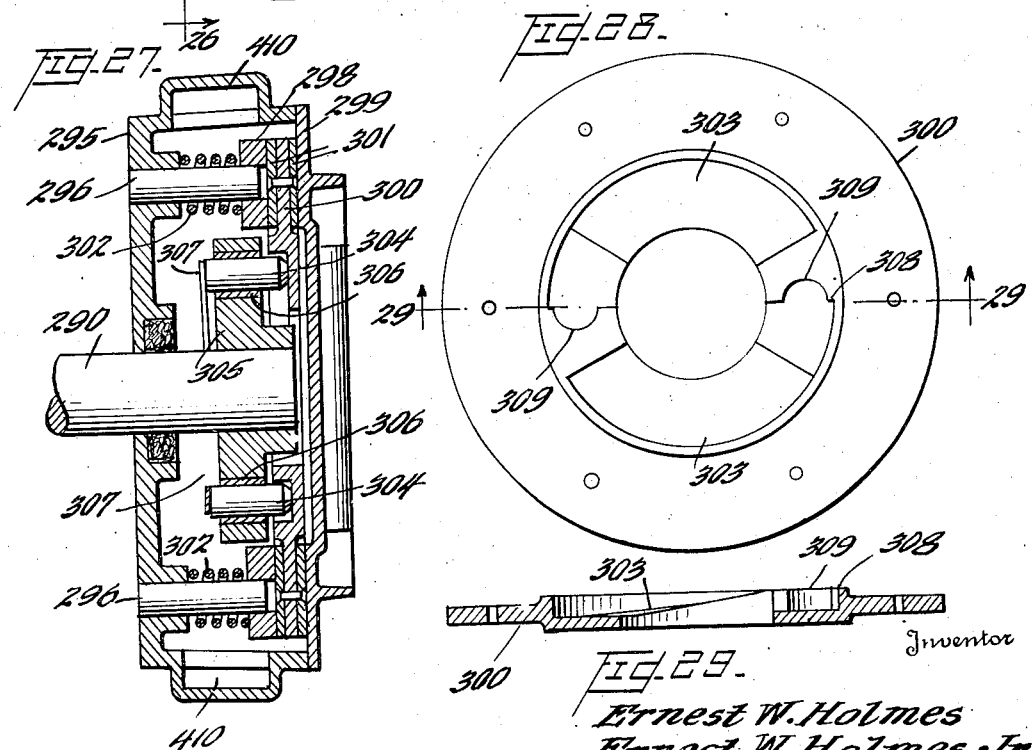

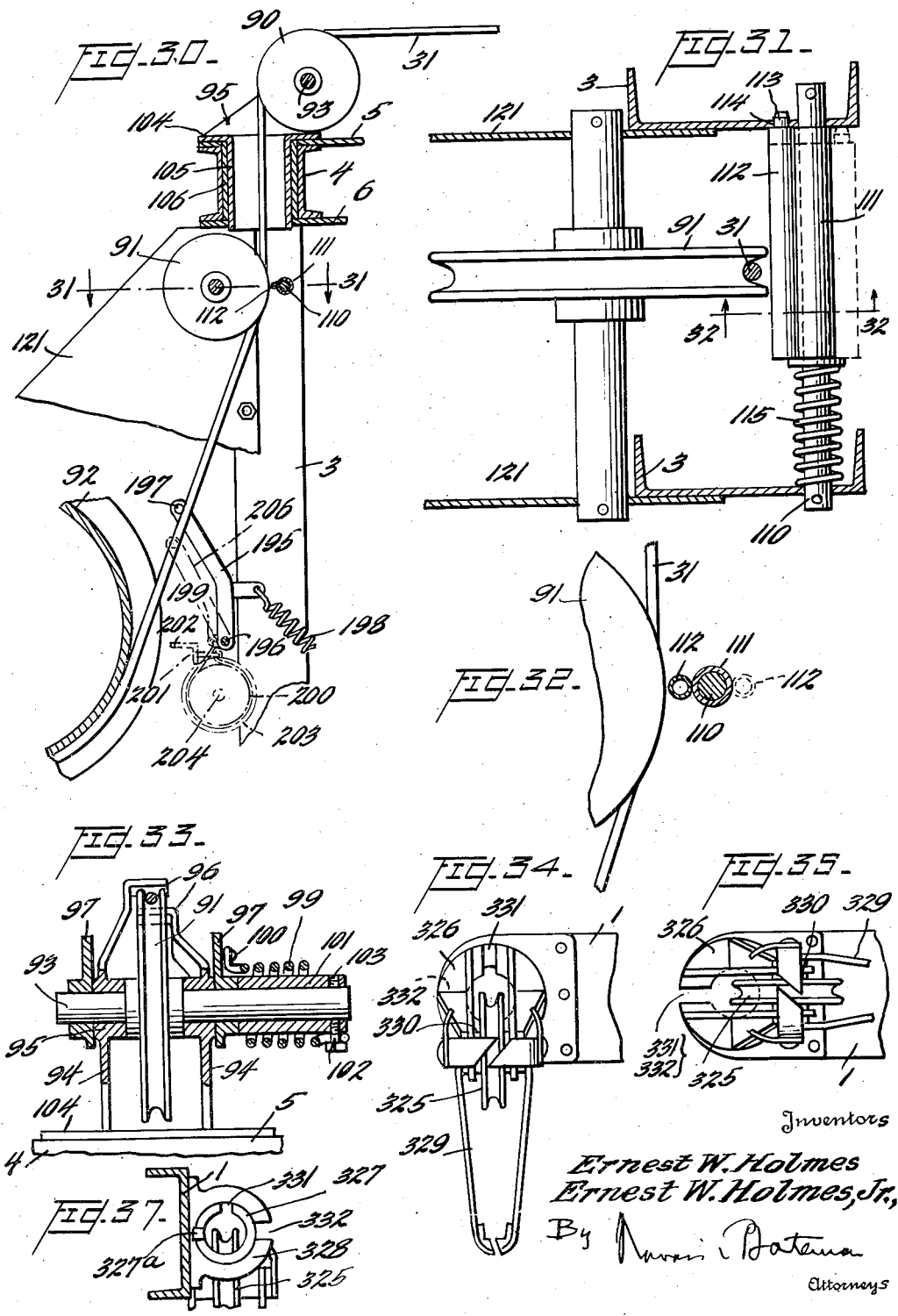

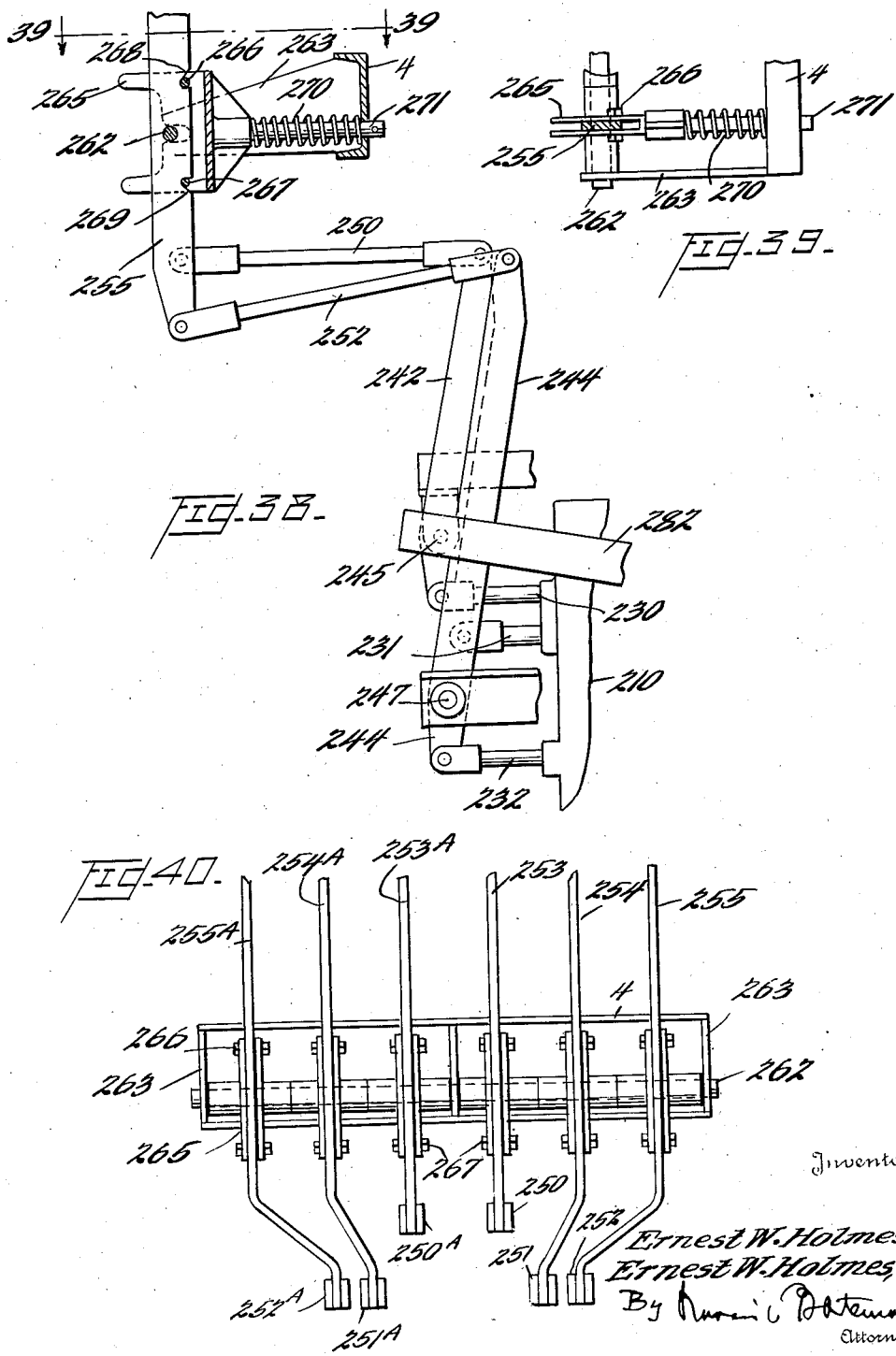

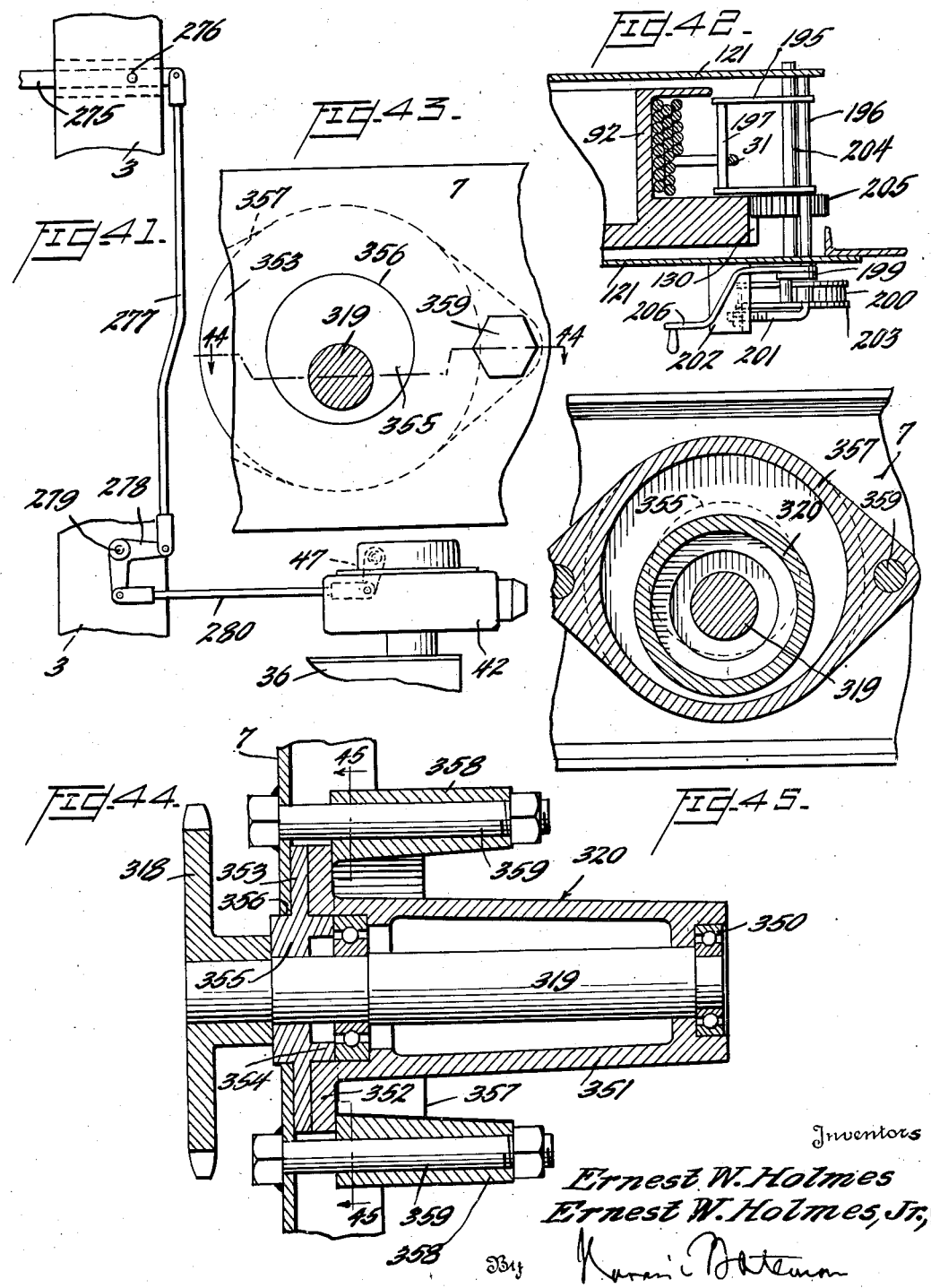

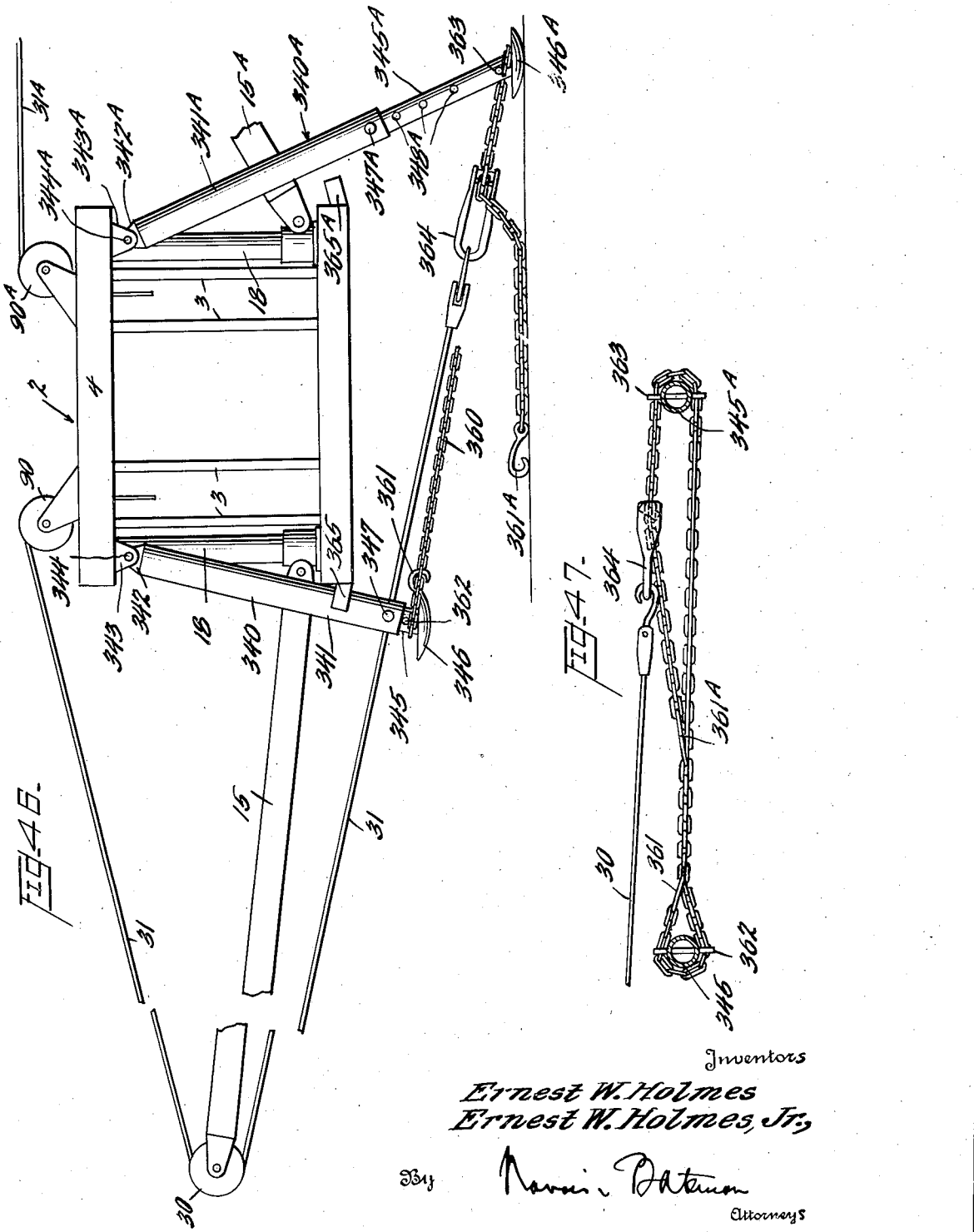

Patented Aug. 16, 1949

2,479,009

UNITED STATES PATENT OFFICE 2,479,009

WRECKER AND SIMILAR HOISTING APPARATUS

Ernest W. Holmes and Ernest W. Holmes, Jr., Chattanooga, Tenn.; S. Bartow Strang, administrator of said Ernest W. Holmes, deceased, assignors to Ernest Holmes Company, a corporation of Tennessee Application December 28, 1944, Serial No. 570,184

20 Claims. (Cl. 214—86)

The present invention relates to improvements in wreckers and similar hoisting apparatus; and more especially apparatus of the mobile type adapted to be mounted on a truck or other suitable vehicle, and comprising means for handling disabled motor vehicles, and for performing hoisting, pulling, towing and other similar operations.

The primary object of the invention is to provide a novel and improved wrecker or hoisting apparatus which is capable of handling heavier loads than heretofore in apparatus of this class in the performance of various operations, and which may be controlled safely and with facility.

A more particular object of the invention is to provide a wrecker embodying a pair of booms provided with cables for raising and lowering them, service cables for the booms, and novel power means for raising and lowering the booms, swinging the booms to various angles and for operating the service cables.

Another object is to provide a power unit in which means for raising and lowering the booms, swinging the booms and operating the service cables are centralized.

Another object is to provide centralized control means for the power means whereby the operations of raising and lowering the booms, swinging the booms, and pulling or paying out the service cables may be controlled with safety and facility by an operator stationed at a single convenient position.

Another object is to provide novel control means for a wrecker of the double boom type, whereby the booms may be either simultaneously or individually raised or lowered, or swung laterally in either direction, and the service cables may be wound or unwound either simultaneously or individually.

Another object is to provide means for automatically stopping the lateral swing of each boom when it has been brought into a predetermined position by the operation of its power means.

Another object is to provide an overdrive for each service cable whereby it may be wound rapidly while slack or the load thereon is relatively light, after which increased power may be applied to the winding of such cable for the lifting or pulling of increased or heavier loads.

Another object is to provide an improved boom structure embodying a telescopic or extensible member which may be adjusted to increase or reduce the effective length of the boom, and thereby increase the range of operation of the boom.

Another object is to provide a boom having a member which may be extended to increase the effective length of the boom, or retracted to reduce the length of the boom under the control of power derived from the wrecker.

Another object is to provide a telescopic or variable length boom having means whereby the operation of increasing the length of the boom automatically raises the boom, and the operation of shortening the length of the boom automatically lowers it.

Another object is to provide novel means for preventing unwinding of the service and boom cables when the winding means therefor are disconnected from the power means.

Another object is to provide means whereby the service cables may be employed for pulling from the rear of the truck, either endwise or from either side thereof.

Another object is to provide novel means for tightening outrigger legs at the sides of the wrecker whereby the wrecker is braced or steadied firmly on the ground, and is thus able to lift heavy loads without shifting its position or tilting, especially while lifting heavy loads at a side of the wrecker.

Another object is to provide a wrecker of the double boom type having means for automatically coupling their outer ends when brought together for conjoint operation, or for steadying them while the wrecker is in transit, the coupling means being readily releasable to uncouple the booms for independent operation.

To these and other ends, the invention consists in certain improvements and combinations and arrangements of parts, all as will be hereinafter more fully described, the features of novelty being pointed out more particularly in the claims at the end of this specification.

In the accompanying drawings:

Figure 1 is a side elevation of a wrecker constructed in accordance with the present invention.

Figure 2 is a rear elevation of the wrecker, showing the booms swung laterally from the respective sides thereof.

Figure 3 is a detail view, on an enlarged scale, of the coupling for the upper ends of the booms.

Figure 4 is a detail section taken on the line 4—4 in Figure 3.

Figure 5 is an elevation, partly in vertical section, and on an enlarged scale, of the lower end of one of the booms and its mast.

Figure 6 is a detail view of the automatic controls for the boom swinging means.

Figure 7 is a top plan, partly in section, of the driving means for the winding means for the boom raising and lowering cable and the service cable for the boom at one side of the wrecker.

Figure 8 is a rear elevation of the structure shown in Fig. 7.

Figure 9 is a top plan, partly in section, of the boom swinging mechanism at one side of the wrecker, showing also a portion of the driving means for the service cable winding drum.

Figure 10 is a vertical section taken on the line 10—10 in Fig. 9.

Figure 11 is a detail section of the clutch for connecting the boom to the respective boom swinging mechanism.

Figure 12 is a detail side elevation of the main and overdrive for one of the service cable winding drums.

Figure 13 is a section taken on the line 13—13 in Fig. 12.

Figure 14 is a detail section taken on the line 14—14 in Fig. 13.

Figure 15 is a detail view, in section, of the detent for holding the main and overdrive for the cable winding drum in neutral position.

Figure 16 is a section taken on the line 16—16 in Fig. 12.

Figure 17 is a detail view of the friction drive for the service cable winding drum.

Figure 18 is a detail section through the winding drums for the service and boom supporting cables, showing the mountings for these drums and the worm drive for the boom supporting cable.

Figure 19 is a side elevation of the main transmission for driving the winding drums for the service cables and the boom supporting cables, and for swinging the booms.

Figure 20 is a central vertical section through the main transmission, taken on the line 20—20 in Fig. 19.

Figure 21 is an end elevation of the main transmission as viewed from the left in Fig. 19.

Figure 22 is a horizontal section through the main transmission, taken on the line 22—22 in Fig. 20.

Figure 23 is a vertical section through the main transmission, taken on the line 23—23 in Fig. 22.

Figure 24 is a side elevation, partly in section, showing the worm gearing for driving one of the service cable drums.

Figure 25 is a detail section, on an enlarged scale, taken on the line 25—25 in Fig. 24, showing the automatic brake for one of the service drums.

Figure 26 is a vertical section taken on the line 26—26 in Fig. 25.

Figure 27 is a section taken on the line 27—27 in Fig. 25.

Figure 28 is a face view of the cam plate shown in Figs. 25 and 27.

Figure 29 is a section taken on the line 29—29 in Fig. 28.

Figure 30 is a vertical section, with parts omitted for clearness, showing the portion of one of the service cables adjacent to its winding drum, the idler sheave, and the cable retainer for the idler sheave.

Figure 31 is a section on the line 31—31 of Fig. 30, on an enlarged scale, showing the idler sheave and retainer.

Figure 32 is a vertical section, taken on the line 32—32 in Fig. 31.

Figure 33 is a vertical section of the swivel bracket for one of the service cable sheaves.

Figure 34 is a rear view of one of the service cable sheaves swivelled on the rear of the wrecker, the sheave being shown in its normal position, as when not in use.

Figure 35 is a view of the sheave shown in Fig. 34 but rotated into a position to permit insertion or removal of the service cable.

Figure 36 is a side elevation partly in longitudinal section, of one of the rear service cable sheaves, and Figure 37 is a section on the line 37—37 in Fig. 36.

Figure 38 is a side elevation of the control levers and their connections to the main transmission.

Figure 39 is a detail horizontal section through one of the control levers, taken on the line 39—39 in Fig. 38.

Figure 40 is a front elevation of portions of the control levers.

Figure 41 is a detail elevation of the connection between the clutch for the power means for swinging one of the booms and its controlling lever.

Figure 42 is a detail horizontal section of the slack controller for the service cable.

Figure 43 is a detail vertical section, on an enlarged scale, taken on the line 43—43 in Fig. 9.

Figure 44 is a horizontal section on the line 44—44 in Fig. 43.

Figure 45 is a vertical section on the line 45—45 in Fig. 44.

Figures 46 and 47 are an elevation and a plan respectively of means for tightening the chain connecting the outrigger legs.

The invention as shown in the accompanying drawings is adapted to be mounted on the chassis of an automotive truck of suitable size and provided with an engine for propelling it, and having a power take-off, which may be of any suitable or well known type, for supplying the power to operate various parts of the wrecker. Since the construction of the truck and its power take-off are well known, it is deemed sufficient to show only the longitudinal frame members 1 of the truck chassis on which the wrecker is mounted and suitably secured.

The wrecker comprises a frame, generally designated 2 composed in the present instance of pairs of uprights 3 at the respective sides of the frame and composed preferably of channel iron with the flanges of each pair turned inwardly toward the center of the frame. The upper ends of these uprights are rigidly connected by a cross member 4 composed preferably of a pair of channel irons secured together by top and bottom plates 5 and 6, and the lower ends of the uprights are rigidly secured to a supporting structure comprising preferably a channel iron 7 and an I-beam 8 rigidly secured together by top and bottom plates 9 and 10, thus forming a base for the frame, the bottom plate extending outwardly from the adjacent side of the longitudinal frame member 1 of the truck chassis.

The wrecker as shown is of the double boom type in which the booms 15 and 15A are pivotally mounted at the respective sides of the frame to swing about vertical axes, these booms according to the present invention being each equipped with power means for swinging it laterally to different desired angles, means for raising and lowering the outer end thereof, and a service cable having means for winding and unwinding it to raise and lower the loads and to perform pulling and other operations, as will be hereinafter described. Since both booms and their associated parts are of the same construction, with the exception that they are mounted respectively on the right-hand and left-hand sides of the wrecker, detail illustration and description of one of these booms and its associated parts will suffice for both, the parts on the left-hand side being shown, and corresponding parts on the right-hand side being designated by the same reference numerals but with the distinguishing suffix "A."

As shown in the present instance, each boom is supported at its inner end on a cap 16 to which it is pivotally connected for raising and lowering movements by a horizontal pivot pin 17, the cap 16 being bolted or otherwise fixed to the lower portion of a tubular mast 18 the lower end of which is rotatable on a vertical axis in a bearing 19 supported by plate 9 attached to the base members 7 and 8 of the frame, as shown in Fig. 5. The upper end of the mast is rotatable in a bearing 20 which is supported by an extension of the plate 5 at the top of the frame. A sheave bracket 21 is fixed to the upper end of the mast to rotate therewith, this bracket carrying sheaves 22 and 23 for the boom supporting cable 24, portions of this cable passing back and forth between the sheaves 23 and sheaves 25 rotatable in a yoke 26, and this yoke being connected to the outer end of the boom in any suitable manner, as for example, by the equalizing sling 27 and sheaves 28 carried by the yoke 26, as shown and described fully in prior copending application Serial No. 528,314 filed March 27, 1944, now Pat. No. 2,405,578 granted August 13, 1946. One end of the boom supporting cable 24 is attached by links 29 to the yoke 26, and the other end of this cable passes around the sheave 22 and then down through the tubular mast to a drum for raising and lowering the boom, as will be hereinafter described. The outer end of the boom carries a sheave 30 around which the service or hoisting cable 31 passes, this cable passing through a guide 32 and usually extending downwardly from the outer end of the boom for hoisting and other operations. By fixing both the boom supporting cap 16 and the sheave bracket 21 to the mast, said bracket will be rotated by the mast in unison and conformity with the lateral swinging movements of the boom about its vertical axis instead of depending on the swing of the boom supporting cable for rotating it.

The present invention provides novel and efficient power means for rotating the boom and its mast laterally into different positions about a vertical axis, and for controlling such operations. The lower end of the mast 18 carries a gear wheel 35 which is keyed or otherwise fixed thereto, this gear being enclosed in a casing 36. A bracket 37 having a guide sheave 38 mounted therein, is provided at the lower end of the mast, this bracket having a spindle 37a which projects upwardly into the tubular mast, and a thrust shoulder 37b which bears against the lower end of the mast, an angle iron bracket 37c being attached to the bracket 37 and to the frame of the wrecker to hold the bracket 37 from rotation when the mast is swung about its vertical axis. The boom cable 24 below the lower end of the mast passes around the sheave 38 and extends to the drum 39 onto and from which it is adapted to be wound and unwound by means hereinafter described. The mast-swinging gear wheel 35 is driven by a pinion 40 (Figs. 9 and 10) which is fixed on a shaft 41, the latter being journaled in a gear housing 42 and having a worm wheel 43 mounted for rotation thereon but is adapted to be coupled to the shaft 41 by a clutch collar 44 which is splined on said shaft and has jaws thereon to engage between complemental jaws on the upper side of the worm wheel, the clutch collar being moved into engaged and disengaged relation with the worm wheel by a fork 45 which is fixed to a shaft 46 rotatable in the top of the housing 42, an end of this shaft extending to the exterior of the housing and having an operating arm 47 fixed thereon. The clutch connection thus provided between the worm wheel 43 and pinion 40 enables the boom swinging gear 35 and pinion 40 to be disconnected from the power drive for swinging of the boom independently thereof, as manually by pulling the service cable laterally of the outer end of the boom. The worm wheel 43 is power driven by a worm 48 which meshes therewith and is fixed on a shaft 49 which is rotatably mounted in the housing 42 preferably by ball bearings 50 which sustain the radial and axial loads thereon, an end of the worm shaft having a sprocket wheel 51 fixed thereon for driving it by means hereinafter described. As the anti-friction bearings for the worm shaft offer very little resistance to backing-off of the worm wheel, it is preferable to provide a brake which will prevent such backing-off while the power drive is not in operation, but will not impose any appreciable resistance upon the power drive while it is in operation, a friction brake being shown for this purpose in the present instance, which comprises a conical collar 52 which is splined on one end of the shaft 49 by a key 53 and is pressed frictionally against the adjacent correspondingly shaped portion of the worm housing by a compressed coil spring 54 which is interposed between the collar and an adjacent bearing 50. By the construction thus far described, rotation of the sprocket wheel 51 in one or the other direction will swing the boom from its normal position at the rear of the wrecker to or toward a position where it projects laterally therefrom, or vice versa.

Each boom is preferably so constructed that it may be lengthened or shortened, as may be desired. Preferably and as shown in the present instance, each boom is composed of telescopic sections 60 and 61, the section 60 at the lower end of the boom having a bracket 62 fixed thereto to carry the horizontal pivot 17, and the other section 61 carrying the service cable sheave 30, and having the boom supporting sling 27 attached to its upper end. The section 61, which slides within the section 60, has a lug 63 fixed thereon, this lug being slidable in a slot 64 extending longitudinally of the outer section 60 and having a cable 65 attached thereto, this cable extending around a sheave 66 rotatable in a bracket 67 fixed on the outer section 60 and having a loop 68 or other attaching device on its free end. Engagement of the lug 63 in the slot 64 prevents rotation of the inner section within the outer section of the boom. By this arrangement a pull applied to the cable 65 will cause the inner boom section 61 to be pulled out or extended from the outer section 60. Such an operation also serves to automatically swing the boom upwardly, since the boom cable 24 connected to the upper end of the boom section 61 acts as a radial tie of fixed length between the upper end of the section 61 and the top of the mast, and as the length of the boom is increased by extending of the section 61, the upper end of the boom is compelled to rise, and thus swing the boom, upwardly. Such concurrent lengthening of the boom and swinging of the boom upwardly, saves much time when it is desired to adjust the boom to reach relatively distant or high objects, or to lift objects to relatively high elevations. The boom section 61 may be locked in different extended positions by inserting a locking pin 69 through diametrically opposite holes 70 in the outer section 60 and through the appropriate pair of diametrically opposite holes 71 which register with the holes 70, a suitable number of pairs of holes 71 being spaced appropriately along the length of the boom section 61. Return of the boom section 61 to its normal position within the section 60 to shorten the boom is accomplished by withdrawing the locking pin and allowing the cable 65 to return to its normal position. Pulling of the cable 65 to extend the boom, and controlling of the return of the boom to its normal length are preferably effected by unreeving the service cable 31 from the sheave 30 and guide 31 and attaching its hook to the loop 68, on the cable 65, and then operating the service cable by its winding and unwinding means.

Means is provided for automatically coupling together the upper ends of the two booms for operation conjointly in the performance of a lifting or pulling operation, and to hold the booms in stable position at the rear of the wrecker during transit. The boom coupling means, as shown in Figs. 3 and 4, comprises a pair of brackets 80 and 81 fixed to the upper ends of the respective boom section 61 and projecting toward one another when the booms are brought into adjacent relation. The bracket 81 is formed with a loop or eye 82 and the bracket 80 is provided with a laterally extending slot 83 which is positioned to receive the loop 82 when the upper ends of the booms are brought together at the rear of the wrecker. The bracket 80 is also provided with a slot 84, which intersects the slot 83 and has a latch 85 pivoted therein on a pin 85a. The upper edge of the latch is provided with a notch 87 of a suitable size to receive the loop 82 while the latter is in the slot 83, and a spring plunger 86 is mounted slidably in the bracket 80 in a direction transversely across the slot 84 therein, and in a position to engage the upper edge of a notch 87a in the tail portion of the latch while the loop 82 on the bracket 81 is engaged in the notch 87 in the latch, and thereby lock the members of the coupling together. The tail of the latch is also provided with a lug 88 which is movable into a position opposite to the latch engaging end of the plunger 86 when the latch is swung into uncoupling position, the latch being thus held in position to automatically receive the loop 82 by the frictional engagement of the plunger 86 therewith under the action of its spring 89, and the plunger being held in its retracted position ready to lock the latch when engaged by the loop 82. The parts are shown in coupled relation in Figs. 3 and 4, the plunger 86 extending across the slot 84 above the tail of the latch under the action of the spring 89, and the latch being thereby prevented from swinging about its pivot to release the loop 82 engaged in its notch 87. Uncoupling is effected by retracting the plunger 86 against the action of its spring 89, the plunger being provided for this purpose with a handle 99. Retraction of the end of the plunger from above the latch frees the latter for rocking movement toward the open end of the slot 83, thereby permitting the loop 82 to be withdrawn from the slot 83 by a force applied to spread the booms apart while the plunger is held in retracted position. Rocking of the latch incident to its release of the loop 82 brings the lug 88 on the tail of the latch into a position to be engaged by the end of the plunger, which, when released, presses thereon and holds the latch in its released or uncoupling position, at which time, the notch 87 in the latch will be presented at the open end of the slot 83 where it will be in a position to receive the loop 82 for the next coupling operation. When the loop enters the slot 83, and the notch 87 in the latch, the latter is rocked into its locked position, as shown in Fig. 4, thereby removing the tail of the latch from the path of the plunger 86 and permitting the latter to spring into locking position above the tail of the latch. Obviously, the coupling means thus provided is capable of coupling together the upper ends of the booms while the latter are either of their normal length or are partially or fully extended, provided the members of the coupling are brought into position to cooperate.

Each service cable 31 extends around a sheave 90 past an idler sheave 91 to a service drum 92. The sheave is swiveled on the top of the cross member 4 of the frame, it being mounted rotatably on a shaft 93 (Fig. 33) which is fixed in the flanges 94 of a bracket 95, these flanges being preferably provided with a pair of guides 96 which overlie the periphery of the sheave 90 to prevent dislocation of the service cable therefrom while this cable is slack, but providing a diagonal opening between them through which the cable may be passed to permit placing of this cable in the groove of this sheave, and removal of the cable therefrom when such is desired. A vertically movable cable guide is also provided for yieldably supporting the service cable so that it will not foul the adjacent boom cable sheaves 22 and 23 as the service cable swings above said sheaves, incident to the swing of the respective boom to and from a lateral position relatively to the wrecker. This cable guide comprises preferably a yoke having a pair of arms 97 which straddle the flanges 94 of the bracket and are mounted rotatably on the shaft 93, the outer ends of these arms having lugs thereon which are located at opposite sides of the cable 31 and overlie it to thereby retain the cable in engagement with the guide, but having a diagonal opening between them through which the cable may be passed to engage and disengage it with respect to the guide. This guide and the portion of the service cable resting thereon, are yieldably supported in elevated position by a coil spring 99 one end of which is hooked or otherwise suitably connected to a lug 100 on one of the guide arms 97, and the other end of the spring is connected to a sleeve 101 which is fixed to the shaft 93 by a screw 102 or other suitable means. The sleeve 101 is preferably provided with a plurality of circumferentially spaced holes 103 in one or another of which the screw 102 may be placed in order to adjust the spring 99 to support the cable guide at the appropriate elevation. This cable guide serves to guide the service cable as it passes onto the sheave 90, its connection to the shaft 93 causing it to swing the sheave to different angles according to the angular positions into which the respective boom or cable may swing about its vertical axis. The sheave bracket 95 is supported rotatably on the top plate 5 by a base plate 104 having a downwardly extending cylindrical portion 105 which is hollow for the passage of the service cable, and is mounted rotatably in a bearing 106 supported in the top cross member 4 of the frame. The vertical axis of the sheave bracket 95 is preferably located opposite to the apex of the angle through which the respective boom swings laterally from one extreme position to the other, and in a vertical plane which substantially bisects said angle, in order that a load suspended by the service cable from the outer end of the boom will be at the same height at the end of the swing as it was at the commencement of the swing, as the boom swings from a position at the side to a position at the rear of the wrecker, or vice versa.

Each idler sheave 91 is preferably provided with a retainer for preventing dislocation of the service cable therefrom while this cable is slack, but permits disengagement of this cable from this sheave when such is desired. This retainer, as shown in the present instance, comprises a shaft 110 (Figs. 30, 31 and 32) which extends between the pair of uprights 3, and has its ends mounted to rotate and also move axially in holes in said uprights. A sleeve 111 is fixed on this shaft and has a rib or rail 112 along one side thereof which projects to an extent which will bring it into close proximity to the peripheral flanges of the sheave 91 when the shaft 110 is rotated into one position, as shown in Fig. 30 and by the full lines in Figs. 31 and 32, thereby retaining the service cable in the groove of this sheave, and said rib or rail will be retracted from the sheave 91 sufficiently to permit removal of the service cable from the groove thereof when the shaft 110 is rotated through a sufficient angle, as indicated for example by the dotted lines in Fig. 32. The rib or rail 112 is preferably provided with a projection 113 at one end which is engageable in a hole 114 in the adjacent upright 3 to lock the rib 112 in cable retaining position, and said projection is preferably held in its hole by a compressed coil spring 115 which encircles the shaft 110 and bears at its ends respectively against the sleeve 111 and the adjacent upright 3. While the retainer is rotated into a position to permit placing of the service cable in the groove of the sheave 91, or removal of said cable therefrom, the projection 113 will be pressed by the spring 115 against the adjacent upright 3, thereby holding the retainer in such position.

Each service cable is adapted to be wound upon and unwound from the drum 92 to perform the hoisting, pulling and other operations. This drum is mounted rotatably on a sleeve or hollow shaft 120 which spans the space between and is secured in a pair of triangular plates 121 between which the drum is accommodated, these plates having vertical edges which are bolted, welded or otherwise securely fixed to the respective pair of uprights, as shown in Fig. 31, the lower or horizontal edges of these plates being bolted or otherwise firmly fixed to the truck chassis on which the wrecker is mounted. These plates thus provide means for rigidly supporting the wrecker frame and its parts on the truck chassis, it being understood that a pair of these triangular plates are provided at each side of the wrecker and are fixed to the pairs of uprights 3 at the respective sides, and house the service drums at the respective sides of the wrecker. Casing sections 122 and 123 are preferably attached to these triangular plates to enclose the upper and lower sides of the respective service cable drum and its associated parts to protect them from the weather and for safety purposes. The sleeve 120 also supports the boom cable drum 39 which is rotatably mounted thereon, this drum being driven by a plate 125 which is fixed thereto and to the outer end of a shaft 126 which is journaled in a bearing 127 supported within the sleeve 120, and said shaft is driven through a coupling 128 by power operating mechanism which will be hereinafter described.

Each service cable drum is driven through a gear 130 which is formed integrally with or attached to one of its flanges. The present invention provides novel means whereby each service drum may be rotated rapidly, as for example, to wind the respective service cable quickly while slack or under a relatively light load, and to be driven more slowly and with greater power while under a relatively heavy load. Such two-speed drive for each service drum, as shown clearly in Figs. 12 to 18 inclusive, comprises a main driving pinion 131 which also meshes constantly with the gear 130. The main pinion is mounted rotatably on a shaft 133 journaled in bearings 134 and 135 fixed in the respective pair of triangular plates, this shaft being provided with splines 136 on which a clutch collar 137 is slidable, this clutch collar being thereby driven from said shaft and having clutch jaws 138 thereon which are engageable with or disengageable from complemental jaws on the adjacent side of the pinion 131 whereby the latter may be coupled to and uncoupled from the shaft 133. The shaft 133 is provided at one end with a coupling 139 for connecting it to its power operating means, to be hereinafter described. A relatively large gear wheel 140 is fixed to the other end of the shaft 133, and this gear wheel meshes with a relatively small pinion 141 mounted on a shaft 142, whereby the latter may be driven from the shaft 133. A friction drive is preferably employed between the shafts 133 and 142 whereby the drive of the shaft 142 will be relieved or interrupted automatically when the load on the service cable exceeds a given amount. For this purpose, the pinion 141 is formed on or fixed to the hub of a friction drum 143 which is mounted rotatably on the shaft 142 and houses a pair of friction shoes 144 arranged to frictionally engage its interior surface under a pressure which is regulated by screws 145 which connect the shoes and are adjustable to relatively expand or contract the shoes. These shoes drive the shaft 142 through a cross arm 146 which is fixed to said shaft, the ends of this arm engaging in sockets 147 in the brake shoes.

The shaft 142 has a gear 150 mounted rotatably thereon and adapted to be coupled thereto by a clutch collar 151 which is slidable on splines 152 on said shaft which splines drive said collar. The clutch collar 151 has clutch jaws 153 which are engageable with and disengageable from complemental clutch jaws provided on the adjacent face of the gear 150. The gear 132 is mounted on a shaft 154, and this shaft and the shaft 142 are journaled in bearings mounted in the triangular plates 121. Since the shaft 142 will be driven by the gear 140 and pinion 141 in a direction reverse to the direction of rotation of the shaft 133, the pinion 132 is interposed as an idler gear between the gear 150 and the drum gear 130, so that the main pinion 131 and also the higher speed or overdrive pinion 132 will both drive the drum in the same direction for a given direction of rotation of the drive shaft 133.

Each main pinion 131 and overdrive gear 150 are selectively rendered operative to drive the respective service drum under manual control of the operator. The control means provided for this purpose comprises, in the present instance, a clutch shifter slide 160 which is guided to move parallel to the shafts 133 and 142 by a rail 161 on which it is slidable, this rail being supported by the triangular plates 121. The slide 160 is provided at one end with a shifter fork 162 which engages and controls the clutch collar 137, and is provided at its other end with a shifter fork 163 which engages and controls the clutch collar 151. These shifter forks are so arranged that when the fork 162 shifts the collar 137 into engagement with the main pinion 131, the fork 163 disengages the collar 151 from the gear 150, the drum 92 being then driven by the main pinion, and when the fork 163 shifts the collar 151 into engagement with the gear 150, the fork 162 disengages the collar 137 from the pinion 131, the drum 92 being then driven through the overdrive gear 150. When the forks are brought into their mid-positions, both clutch collars will be in disengaged position, the drive for the service cable drum being then in neutral.

The manual means shown in the present instance for reciprocating each clutch shifter slide 160 comprises a crank disk 170 which is fixed on a shaft 171, the inner end of the latter being mounted rotatably in an angle iron 172 fixed to the inner side of one of the plates 121, and the outer end of this shaft extending through a casing section 122a and being provided with an exterior handle 173 by means of which it may be rotated. The crank disk 170 carries a crank pin 174 which engages one end of a link 175, the other end of this link engaging a pin 176 fixed to the clutch shifter slide 160. (Figs. 13, 14 and 15.) The throw of the crank pin 174 is preferably such that when the disk 170 is rotated to bring this crank pin into alignment between the pin 176 and the shaft 171, the slide 160 will be fully shifted to a position to fully engage the clutch collar 137 with the main drive pinion 131, and when the disk 170 is rotated through a half revolution, or substantially so, the clutch collar 151 will be fully engaged with the gear 150. A compressed coil spring 177 is preferably employed for biassing the disk toward and yieldingly holding it in one or the other of such clutch engaging positions, this spring encircling a rod 178 carried by a link 189 which is pivotally connected to the disk 170 by a pin 190 adjacent to the crank pin 174, the rod 178 being slidably guided by a lug 191 fixed to the inner side of the adjacent plate 121. Overthrow of the disk 170 under the influence of the spring 177 in a direction to disengage the clutch collar 137 and engage the clutch collar 151 is prevented by a lug 192 on the disk 170 which projects laterally therefrom in a position to come to rest on the link 175 when the shifter slide has been fully shifted in said direction. Overthrow of the crank disk in the opposite direction under the influence of the spring 177 will be prevented by abutting of the lug 192 against the other side of link plate 175. A spring-pressed plunger 193 is preferably mounted in the angle iron 172 in a position to engage yieldingly in a recess 194 in the link 189 when the crank disk 170 is in its mid-position, the clutch shifter slide being thereby held in its middle or neutral position with both clutch collars disengaged, the plunger yielding to permit rotation of the crank disk when sufficient force is applied to rotate the shaft 171, and thereby effect a clutch shifting operation.

The driving means thus provided for each service cable drum enables the respective service cable to be wound or unwound rapidly through the high speed or overdrive, whenever desired, as when taking up slack or lifting or pulling relatively light loads by the service cable, and to be wound with greater power, as while lifting or pulling relatively heavy loads. When the drive for this drum is placed in neutral, both drives will be unclutched therefrom, and any desired length of the service cable can then be pulled manually from its drum.

In order to prevent uncontrolled unwinding of the service cable from its respective drum while this cable is slack or there is no load thereon, an automatic slack control device is preferably employed. The slack control device shown in the present instance comprises a lever 195 (Fig. 30) which is fixed at its lower end to a shaft 196 mounted rotatably in the plates 121, and carries a bar 197 at its upper end which is pressed yieldingly against the portion of the service cable 31 which is between the idler sheave 91 and the service cable drum 92 by a spring 198. An end of the shaft 196 which extends to the outside of the outer plate 121 has a lever 199 which is fixed thereon and connected to one end of a brake band 200 the other end of which is adjustably connected by a screw 201 to a bracket 202 fixed on the outer side of the adjacent plate 121. The brake band cooperates with a brake drum 203 which is fixed on a shaft 204 journaled in the plates 121 and has a gear 205 fixed thereon and meshing with the gear 130 on the service cable drum. While the service cable is taut, as while a load is being lifted or pulled thereby, or while the cable is being pulled manually from the drum, the lever 195 will be held by this cable in a position to hold the brake band in released relation with its brake drum, thus avoiding drag of the brake on the service cable drum during such an operation, but when pull on the service cable is discontinued, the lever 195 will be pulled by the spring 198 into a position to apply the brake band to the brake drum, and thereby immediately stop unwinding movement of the cable drum. In order to permit free winding of the cable manually upon the drum, when such is desired, a hand release lever 206 is fixed to the outer end of the shaft 196 whereby the latter may be rotated into a position to release the brake band from its cooperating brake drum. Such a slack controlling device is particularly advantageous when relatively heavy steel cables are employed for the service lines, as it prevents loosening of the underlying layers of cable on the drum which, if permitted to occur, would result in cutting through and wedging of the cable between the loose layers on the drum, making it very difficult to release, and possibly damaging the cable.

The present invention provides power means for operating the service cables, the boom supporting cables and the boom swinging means at both sides of the wrecker from the usual power take-off of the truck, and in the preferred construction such power means is centralized in a single power transmission unit. Such unit, as shown in detail in Figs. 19 to 23, inclusive, comprises a casing 210 the feet 211 of which are bolted or otherwise fixed to the frame base composed of the transverse members 7 and 8, the casing having a main drive shaft 212 mounted centrally therein and provided on its outer end with a sprocket wheel 213 adapted to receive a chain 214 for driving it from a sprocket wheel 215 on a counter shaft 216 mounted in suitable bearings on the underside of the frame base, the countershaft being adapted to be connected by the usual or known means to the conventional power take-off on the transmission of the truck.

The main shaft 212 carries a pair of gears 217 and 218 which are fixed thereto, and which cooperate with sets of gears to drive them in relatively reverse directions. The gear 217 is of larger diameter than the gear 218, and it meshes directly with a set of pinions 219 which are mounted rotatably on a set of shafts, 220, 221, and 222 for the boom at the left-hand side of the wrecker, a duplicate set of these shafts designated by the same reference characters but distinguished by the suffix "A" being provided for the boom at the right-hand side of the wrecker. These shafts are mounted in the casing 210 in a circle around the central shaft 212. These shafts also have a set of pinions 223 mounted rotatably thereon, these latter pinions being of smaller diameter than the pinions 219, and being geared to the relatively smaller gear 218 by a set of intermediate or idler pinions 224. By this arrangement, the pinions 219, being meshed with gear 217, will be driven in the opposite direction to that of gear 217, and the pinions 223, having the idler pinions 224 interposed between them and the smaller gear 218, will be driven in the same direction as gears 217 and 218, both of which are mounted on and rotate with the main central control shaft. The shafts carrying the pinions 219 and 223 are splined and carry individual clutch collars 225 which are rotatable with these shafts and are slidable axially on the splines thereon to couple one or the other pinion 219 or 223 to the respective pinion shaft, each clutch collar being provided for this purpose with clutch jaws on its opposite ends to engage respectively complemental clutch jaws on one or the other pinion, according to the direction in which the clutch collar is shifted. The clutch collars on the pinion shafts are each provided with a shifting fork 226 which is carried by a shifting rail which is slidable in the casing 210, these shifting rails for the clutch collars on the pinion shaft 220 and 220A being designated 230 and 230A respectively, the shifting rails for the clutch collars on the pinion shafts 221 and 221A being designated 231 and 231A respectively, and the shifting rails for the clutch collars on the pinion shafts 222 and 222A being designated 232 and 232A respectively. The transmission unit thus embodies gearing for operating the service and boom supporting cables, and for swing the booms which are provided at both the right-hand and left-hand sides of the wrecker.

The shafts 220 and 220A are provided with sprocket wheels 233 and 233A for driving the swinging mechanisms for the booms at the left-hand and right-hand sides respectively of the wrecker, the sprocket wheel 233 being shown connected by a chain 234 to the sprockets wheel 51 on the shaft of the worm 48 which swings the left-hand boom about its vertical axis, it being understood that the right-hand boom is provided with a similar mechanism for swinging it, and that such mechanism is operated by the sprocket wheel 233A. The shafts 221 and 221A are provided with couplings 240 and 240A for driving the service cable drums at the left-hand and right-hand sides, respectively, and the shafts 222 and 222A are provided with sprocket wheels 241 and 241A for driving the drums for the boom supporting cable at the left-hand and right-hand sides respectively of the wrecker.

The clutch shifting rails 230 and 230A for controlling the boom swinging mechanisms at the respective sides of the wrecker are operated by levers 242 and 242A respectively, the clutch shifting rails 231 and 231A for controlling the service cable drums at the respective sides of the wrecker are operated by levers 243 and 243A respectively, and the clutch shifting rails 232 and 232A for controlling the boom supporting cables at the respective sides of the wrecker are operated by levers 244 and 244A respectively. The levers 242 and 242A are fixed on shafts 245 and 245A rotatably mounted in suitable brackets on the transmission casing, these shafts having yokes 246 to clear the adjacent levers, the levers 243 and 244 are pivoted on a common pivot pin 247 fixed to one side of the center of the casing, and the levers 243A and 244A are pivoted on a common pivot pin 247A fixed to the other side of the center of the casing, as shown in Figs. 19 and 21.

These levers extend upwardly from the front of the transmission casing, the levers 242, 243 and 244 controlling the left-hand mechanism being connected by rods 250, 251 and 252 to the lower ends of control levers 253, 254 and 255 respectively, and the levers 242A, 243A and 244A controlling the right-hand mechanisms being connected by rods 250A, 251A and 252A to the lower ends of control levers 253A, 254A and 255A respectively, these control levers being pivotally mounted on a common shaft 262 which is supported on the top cross member 4 of the frame by brackets 263 in a position where the upwardly extending levers will be within convenient reach of an operator standing on a platform 264 suitably supported on the framework of the wrecker. The control levers preferably occupy upright positions while the jaw clutches controlled thereby in the transmission casing are in their neutral or disengaged positions, and are swung forwardly or rearwardly to engage such jaw clutches with the respective pinions to effect operation of the service and boom supporting cable drums and boom swing mechanism in one or the other direction. Means is preferably employed for returning each of these control levers to its neutral position when released from the hand of the operator, and for yieldingly retaining it in such position. For this purpose, each control lever is provided with a neutralizing device comprising a yoke 265 which straddles the lever and carries a pair of pins 266 and 267 located respectively above and below the lever supporting shaft 262 and both of which are engageable in recesses 268 and 269 in the rear edge of the lever when the latter is in its central or neutral position, the yoke being yieldingly pressed into such a position by a compressed coil spring 270 which encircles a guiding rod 271 attached to the yoke, the spring bearing at its ends respectively against the yoke and against a relatively fixed part of the frame. When the control lever is rocked forwardly or rearwardly about its pivot 262, one or the other of the pins 266 and 267 on the yoke will be pressed back against the action of the spring while the other of these pins on the yoke will withdraw from its recess in the lever. When the grasp of the hand of the operator on the lever is released, the spring 270 will be free to expand, thereby causing the pin 266 or 267 which may be acting on the lever above or below its pivot, to swing the lever to its central or neutral position, whereupon both of the pins on the yoke will engage the lever respectively above and below its pivot, this action of the spring on the lever then being equalized so that the swing of the lever will be arrested when it reaches its neutral position, and it will be yieldingly retained in such position.

Another control lever 275 is provided adjacent to the control levers just described, for operating the clutch 44 (Fig. 10) which connects and disconnects the boom swinging mechanism with respect to its power operating work 48 at one side of the wrecker, a duplicate 275A of this lever being provided for the boom swinging mechanism at the other side of the wrecker. These levers are pivoted on pins 276 and 276A respectively, supported on the stationary frame and are pivotally connected at their rear ends to the upper ends of rods 277 and 277A respectively, which control the clutches which connect the boom swinging mechanism at the sides of the wrecker to their power driving means. One of these rods, 277, is shown as pivotally connected for this purpose to one arm of a bell-crank lever 278 pivoted on the stationary frame at 279, the other arm of this bell-crank lever being operatively connected by a rod 280 to the lever 47 which controls the clutch 44. By swinging the lever 275 upwardly or downwardly, the clutch 44 is engaged with or disengaged from the worm wheel 43, thereby connecting or disconnecting the boom swinging mechanism at the respective side of the wrecker with respect to its power operating means, and thereby permitting the boom to be swung manually in either direction about its vertical axis. The duplicate rod 277A is similarly connected to the clutch controlling the duplicated boom swinging mechanism at the other side of the wrecker.

Means is also provided for automatically disengaging the power drive when the boom at the respective side of the wrecker reaches predetermined limits of swing in either direction about its vertical axis, such means comprising a pair of cams 280 and 281 (Fig. 6) which are clamped or otherwise fixed in appropriate relative position on the rotatable mast 18 of each of the booms, and an arm 282 which is fixed to the respective shaft 245 or 245A controlling the jaw clutch which drives the respective pinion shaft 220 or 220A, the arm 282 having a pin 283 projecting therefrom into the space between the cams. The cams are so shaped and positioned on the mast that while the boom occupies an angular position about its vertical axis, which position is within the limits desired for the swing of the boom in either direction, the pin 283 will be free to play between the cams when the respective control lever 242 or 242A is operated to engage the respective jaw clutch with one or the other pinion on the pinion shaft 220 or 220A to apply power to swing the respective boom in either direction, but if said control lever is held inadvertently in its actuated position, it will be returned automatically to its neutral position and thereby arrest the power drive for the boom swinging mechanism, by the riding of one or the other of the cams 280 and 281 against the pin 283, which returns the arm 282 to neutral position between the cams. By adjusting the cams 280 and 281 around the mast, the points at which the lateral swing of the boom is arrested may be predetermined, as desired.

The power drives for the service cable drums at the respective sides of the wrecker comprise a pair of worm gearings 285 and 285A (Fig. 7), one of these gearings, which are of duplicate construction, being shown in detail in Fig. 24. Each of these gearings comprises a worm wheel 286 which is fixed on a shaft 287 suitably journaled in a housing 288, the latter being mounted in fixed position on the stationary frame of the wrecker, the worm wheel shaft 287 being connected to the coupling 139 on the main pinion shaft 133 which drives the service cable drum 92. The worm wheel is driven by a worm 289 fixed on a shaft 290 mounted preferably on ball bearings 291 in the housing 288, and the worm shaft is connected by a coupling to the respective pinion shaft in the transmission 210 which drives the service cable drum. As shown in Fig. 24, the worm shaft of the gearing 285 is connected by a coupling 292 to the coupling member 240 of the transmission for the left-hand service cable drum, and the worm shaft for the worm gearing 285A for driving the right-hand service cable drum is similarly coupled to the coupling member 240A of the transmission.

In order to overcome any tendency of the worm 289 to back off while a load is supported by the respective service cable and the power drive therefor is not in operation, the worm gearing for each of the service cable winding drums is preferably provided with a brake which will prevent such backing off but will not impose any appreciable resistance upon such gearing while a load is being lifted or pulled by the service cable. The brake for the worm gearing for the service cable winding drum at each side of the wrecker comprises, as shown in Figs. 24 to 29 inclusive, a casing 295 which is bolted to the housing 288 and into which one end of the worm shaft 290 extends, this casing having a suitable number of pins 296 secured therein in parallelism with said shaft and spaced around it, these pins engaging in correspondingly spaced holes 297 in an annular pressure plate 298 so that this plate is held against rotation but is movable axially of the casing. The casing is provided with a cover 299 which is bolted or otherwise rigidly secured thereto opposite to the plate 298, and a friction disk 300 is interposed between said plate and the cover, this disk being preferably faced on its opposite sides with rings 301 of suitable friction material. Pre-loaded springs 302 encircle the pins 296 between the casing 295 and the plate 298, and press the latter against the friction disk 300 and the latter against the cover 299 to impose a predetermined resistance to rotation of the friction disk. The friction disk 300 is formed with a pair of diametrically opposite helical cams 303 on which ride the ends of a pair of diametrically opposite pins 304 carried by a collar 305 keyed or otherwise connected to the worm shaft 290 to rotate therewith, these pins extending through and being movable axially in holes 306 in said collar and being attached to leaf springs 307 which are secured to the face of the collar 305 remote from the cams, and acting to maintain the pins 304 in contact therewith. Shoulders 308 are formed between the raised end of each cam and the adjacent depressed end of the other cam, and recesses 309 are formed in these shoulders in positions to receive the pins 304. Normally, rotation of the worm shaft 290 in a direction to unwind the cable on the service drum will be resisted when the pins 304 are carried by retrograde rotation of the worm shaft into engagement with the recesses 309 in the friction disk 300, rotation of the latter being resisted frictionally under the action of the pre-loaded springs 302. Unwinding of the service cable while a load cross-member 4 of the frame, the lugs on the leg and on the attaching bracket being pivotally connected by a pin 344 which enables the leg to normally occupy a position close to the respective side of the wrecker, and to be swung outwardly therefrom to a desired angle to engage the ground and thereby act as a strut or brace. The tubular upper section of the leg has a lower section 345 which telescopes therein when the leg is not in use, and which may be extended downwardly therefrom into engagement with the ground, this section having a foot 346 on its lower end to provide a firm support on the ground. The length of the leg is adjusted according to the angle into which it is swung outwardly and the distance to the ground, and is locked at such length by a pin 347 which is inserted through holes in the lower portion of the upper section, and through the appropriate one of a series of holes 348 spaced longitudinally in the lower section of the leg.

Means is provided for firmly holding the ground engaging ends of the legs in positive relation to the wrecker and for preventing the legs from sliding outwardly under the reaction to the force applied in lifting or pulling the loads. Such means comprises preferably a chain 360 which, as shown in Figs. 46 and 47, has hooks 361 and 361a at its ends, one end of the chain being looped to form a sling around the lower end of one of the legs, such as the leg 340 which may be in lifted non-operative position and retracted against the respective side of the frame of the wrecker, slipping of the sling upwardly on this leg being prevented by a cross-pin 362 in holes in the lower end of this leg. The other end of the chain is passed around the lower end of the other leg 340A, it being prevented from slipping upwardly thereon by a pin 363 extending through holes in the lower end of this leg, and attaching one of the service cables to this end of the chain and pulling thereon to tighten the chain prior to lifting or pulling the load. The service cable at the appropriate side of the wrecker may be readily brought into position for such an operation by swinging its boom to that side of the wrecker, and the service cable may be attached to the chain by a grab-hook 364. Pulling the cross-chain by the service cable will draw one of the legs, such as the leg 240, solidly in a socket 365 on one side of the frame of the wrecker, and will pull the other leg 240A inwardly toward the other side of the wrecker until this leg obtains a firm footing on the ground, thus providing a stable support for sustaining the load imposed upon the boom at the side of the wrecker from which the leg 240A is lowered. Obviously, if a load is to be lifted from the other side of the wrecker, the leg 240 will be lowered, and the leg 240A at the other side will be in raised position, and the service cable and boom at the latter side will be employed for tightening the chain. After the cross chain has been tightened, the hook 361a is engaged in the chain beyond the grab-hook, and the service cable may then be detached from the cross-chain and will then be available for other use. The means thus provided for stabilizing the wrecker overcomes a difficulty heretofore experienced in tightening such a heavy cross-chain manually, and as the chain may be tightened before applying a load to the wrecker, shifting of the wrecker on the ground engaging leg under the load is avoided.

The general operation of a wrecker constructed as hereinbefore described is as follows: Normally, the outer ends of the booms may be coupled together, the booms then mutually cooperating to hold them at the rear of the wrecker during transit, and while so coupled, the service line of either boom, or the service lines of both booms, may be employed to lift and support an end of an automotive vehicle for towing, or for lifting or supporting heavy loads for various other purposes, the coupling together of the booms enabling them to resist forces tending to swing them laterally. While the booms are coupled together the load may be lifted or pulled by the service cable of the left-hand or right-hand boom by operation of the appropriate manual control lever 254 or 254A, or by the service cables of both booms by operation of both of these control levers simultaneously.

When it is desired to employ the service cable of either boom separately or independently of the other boom for lifting or pulling at one or the other side of the wrecker, the booms are uncoupled by releasing the coupling, and the appropriate lever 253 or 253A is operated to apply power from the main transmission 219 to the boom swinging mechanism to swing the selected boom laterally to the desired angle, and if the control lever is not released or restored to its neutral position before the boom reaches the limit of its swing, the power drive for the boom swinging mechanism will be automatically disconnected by one or the other controlling cam on the mast of the respective boom when the latter reaches the limit of its swing. If it is desired to raise either boom, as when a relatively high object is to be lifted or an object is to be lifted to a relatively high elevation, the appropriate control lever 255 or 255A is operated to connect the respective boom cable winding drum to its power drive, this drum being automatically held from backing off under the weight of the boom and also any load that may be suspended therefrom, by the automatic friction brake, which prevents backing-off of its driving worm as hereinbefore described, when the power means is disconnected from the boom cable winding drum. Lifting or pulling of the load by the service cable is effected by operation of the appropriate control lever 254 or 254A which connects the corresponding service cable winding drum to its power drive, and after such power drive has been disconnected by releasing the control lever, the brake hereinbefore described will prevent unwinding of the respective service cable winding drum.

If the object to be lifted is at a greater distance than usual, or is relatively high or is to be lifted to a relatively high position, the range of operation of either boom may be increased accordingly by lengthening the boom, such being accomplished by extending the inner section of the boom by pulling the cable 65, which may be done conveniently by unreeving the respective service cable from the sheave at the outer end of the boom and attaching it to the cable 65, and then winding the service cable, which operation, as hereinbefore explained, not only extends the inner section of the boom but also raises its outer end. Return of the inner section of the boom to its normal position may also be controlled by the service cable.

If a large amount of slack is to be taken up in either service cable, or a relatively light load is to be pulled over a considerable distance, either from one of the booms or one of the rear sheaves, such may be accomplished rapidly by setting the high speed or overdrive for the reis thereon and the power drive is disconnected from the service cable drum is thereby prevented, although the friction brake action provided is not sufficient to prevent or resist to an objectionable extent, unwinding of the cable by power driving of the drum to lower or release the load. However, when the worm is driven in a direction to effect winding of the service cable on its drum, as in lifting or pulling a load, the pins 304 are carried in a reverse direction around the cams 303 and they ride idly over the shoulders 308 thereon, with the result that the pins 304 do not rotate the friction disk 300 but permit the worm shaft to rotate in a cable winding direction freely and without any brake action thereon. Ventilating openings 410, 411 and 412 are provided in the sides and end of the brake casing for the circulation of air for cooling, these openings being protected against the entrance of rain or moisture by louvres 413, 414 and 415.

The drums for the boom supporting cables at the sides of the wrecker are driven through worm gearings 310 and 310A respectively. (Fig. 7.) These worm gearings, which are preferably duplicates, are similar in construction to the worm gearings for driving the service cable drum, one of these gearings being shown in Fig. 24. As shown in Fig. 18, the worm gear 311 of the gearing 310 is fixed to a shaft 312 which is connected to the coupling 128 on the shaft 126 which drives the left-hand boom winding drum 39. The worm of the worm gearing 310A for the right-hand boom is similarly connected to a coupling 128A which drives the drum for the boom supporting cable for the right-hand boom. The shaft 313 for driving the worm 314 of the gearing 310 is connected, preferably through universal joints 315 and 316 and shaft 317, to a sprocket wheel 318, the latter being mounted on a shaft 319 which extends through a hole in the base member 7 of the frame, and is journaled in a bearing 320 which is bolted or otherwise secured in fixed position on the said base member. The sprocket wheel 310 is connected by a chain 321 to the sprocket wheel 241 on the transmission 210. The worm shaft of the gearing 310A for the right-hand boom is similarly connected to a sprocket wheel 318A which is connected by a chain to the sprocket wheel 241A on the transmission. These worm gearings 310 and 310A are preferably provided with automatic brakes, like that shown in Figs. 24 to 29 inclusive for the winding drums for the service cables, for preventing backing off of the worms while the power drive therefor is not in operation and while the boom cables are supporting the booms, but which brakes are automatically released when the boom winding drums are driven to wind the boom cables thereon to lift the booms.

Each of the bearings 320 is preferably adjustably adjustable for the purpose of adjusting the respective claim engaging the sprocket wheel 318. For this purpose, the sprocket wheel shaft 319 is mounted on bearings 350 carried by a bearing housing 351, one end of which is formed with an annular flange 352, this housing being mounted on a plate 353 and positioned thereon by a circular flange 354 on one side of said plate. The other side of the plate 353 has a hub 355 thereon which is circular, but is eccentric to the shaft 319 and its bearings, and it is fitted rotatably in a circular hole 356 provided in the vertical web of the channel iron 7. Rotation of the bearing housing 351 and plate 353 will adjust the axis of the shaft 351 and sprocket wheel 318 in a manner to enable the chain 321 to be properly adjusted. The bearing is retained in adjusted position by a clamping ring 357 which bears against the flange 352 on the bearing housing, and is provided with lugs 358 through which bolts 359 extend, these bolts extending through the web of the channel iron base number 7, and acting when tightened to firmly clamp the bearing housing and eccentric carrying plate against rotation, thus maintaining the desired adjustment of the chain.

In order to enable objects to be pulled from an end or either side of the wrecker by either or both of the service cables independently of the booms, a pair of swivelled sheaves 325 are mounted on an end of the truck chassis, one at each side of the center thereof, they being shown in the present instance as mounted at the rear of the truck chassis. Each of these sheaves is journaled in a bracket 326 having a cylindrical portion 327 which is swivelled in a similarly-shaped socket 328 which is bolted or otherwise secured firmly to the end of the truck chassis. The sheave bracket carried a cable guide 329 which is pivoted on the sheave shaft 330, and the sheave bracket has a slot 331 which is brought into register with a slot 332 in the socket when the cable guide is swung inwardly into a substantially horizontal position, as shown in Fig. 35, so that the respective service cable 31, after being unreeved from its boom and idlers 90 and 91, may be extended directly rearwardly from its winding drum 92 and inserted through these registering slots, and passed around the sheave 325. When the sheave bracket is rotated out of such position by swinging the cable guide downwardly about the axis of the swivel, the slots are out of register and the cable will then be retained in the sheave bracket. The service cable may then be employed for pulling directly from the rear of the wrecker, or from either side thereof. Similar swivelled sheaves may obviously be provided at the front of the truck chassis.

The cylindrical portion 327 of the sheave bracket is preferably retained in the socket 328 by a lug 327a which may be cast on the end of the portion 327 which projects forwardly from the socket, this lug being somewhat narrower than the width of the slot 332 in the socket, so that by rotating the sheave bracket out of its normal working position into a position to bring the lug into alinement with the slot 332, the cylindrical portion 327 of the sheave bracket may be inserted axially into the socket, and when the sheave assumes its normal position the lug will be rotated out of alinement with the slot 332 and will be in a position to abut against the forward end of the socket and thus prevent pulling of the sheave bracket out of the socket until the sheave bracket is again rotated to bring the lug into alinement with said slot, which is not a normal working position of the sheave bracket.

In order to increase the stability of the wrecker, especially while heavy loads are being lifted or pulled at either side, a pair of legs 340 are provided, and according to the present invention, these legs are attached to the wrecker in positions where they will not limit or otherwise interfere with the swing of the booms. Preferably and as shown in the present instances, each of these legs comprises an upper tubular section 341 having a head fixed in its upper end which is provided with lugs 342, and a bracket having cooperating lugs 343 is securely fixed to the under side of the respective end of the top spective service cable winding drum into operation by turning the handle 173 in the appropriate direction, the overdrive gearing causing this drum to wind the service cable more rapidly than when the main drive is in operation. If the load becomes too heavy for the overdrive, the friction drive therefrom will slip, thus avoiding damage to the overdrive, and the overdrive may be unclutched and the main drive pinion may then be brought into operation by turning the handle 173 in the opposite direction.

As the control levers are centralized, they may be operated quickly and conveniently by a single operator, and as the power controlling levers are provided with means for automatically restoring them to their neutral positions when they are released, and for normally holding them in such positions, safety against inadvertent power operation of any of the parts of the wrecker is provided.

We claim:

1. In a hoisting apparatus comprising a boom mounted to swing vertically and laterally, a service cable carried by the boom, a drum for winding and unwinding said cable, a cable for supporting the boom in different vertical positions, a drum for winding and unwinding the boom supporting cable to raise and lower the boom, and means connected to the boom for swinging it laterally in either direction, a power unit comprising a pair of power driving gears, shafts connected respectively to the drums for the service and boom supporting cables and the boom swinging means, a pair of pinions on each of said shafts and driven in relatively reverse directions by said power driving gears, and means for connecting either pinion on each shaft to the respective shaft and concurrently disconnecting the other pinion therefrom.

2. In a hoisting apparatus according to claim 1, wherein said pinion connecting and disconnecting means comprises a clutch on each of said shafts between the pinions thereon, clutch shifting rails slidable in parallelism with the axes of said power driving gears and shafts, and operating levers connected to the respective clutch shifting rails.

3. In a wrecker comprising a frame supporting a pair of booms at the respective sides thereof for lateral swinging movements and also for raising and lowering movements, service cables on the respective booms, drums for winding and unwinding the respective service cables, boom raising and lowering cables for the respective booms, drums mounted at the respective sides of the frame for winding and unwinding the respective boom raising and lowering cables, means at the bases of the respective booms for swinging them laterally, and a power take-off shaft extending longitudinally between the sides of the frame, a transmission unit common to said drums and boom swinging means comprising a casing mounted on the frame between the sides thereof and above the take-off shaft, a main power shaft journaled centrally in said casing above and parallel to the take-off shaft and having means for connecting it to said shaft, a pair of gears fixed on said main power shaft, a set of shafts mounted in the casing in a circle around the main power shaft and having means for connecting them to the respective drums and boom swinging means, a pair of pinions on each shaft of said set and having means for driving them in relatively opposite directions from the gears on the main power shaft, and means individual to each pair of pinions for connecting one or the other thereof to its respective shaft.

4. In a wrecker according to claim 3, wherein said pinion connecting means comprises clutch members splined on said set of shafts and shiftable thereon to engage one or the other pinion thereon, and a set of rails slidable in the casing and connected to the respective clutch member for shifting them.

5. In a wrecker according to claim 3, including sets of levers pivoted on the casing and connected to the respective pinion connecting means for controlling the operations of the drums and boom swinging means at the respective sides of the wrecker.

6. In a wrecker according to claim 3, including a row of manual control levers having means connecting them to the respective pinion connecting means for controlling the operation of the drums and boom swinging means at both sides of the wrecker.

7. In a wrecker according to claim 3, including a row of manual control levers having means connecting them to the respective pinion connecting means for controlling the operation of the drums and boom swinging means at both sides of the wrecker, and means cooperative with each of said levers for restoring it to inactive position when relieved of an operating force.

8. In a wrecker according to claim 3, including a row of manual control levers each movable in opposite directions from a neutral position and having means operatively connecting them to the respective pinion connecting means, and means cooperative with each of said levers for restoring it to neutral position when relieved of an operating force.

9. In a wrecker according to claim 3, including a row of coaxially pivoted manual control levers having means operatively connecting them to the respective pinion connecting means, a member having projections arranged to bear on each lever at points respectively at opposite sides of its pivotal center, and a spring normally pressing said projections against the lever but yieldable under a force applied to rock the lever in either direction on its pivot.

10. A wrecker comprising a frame, a pair of booms pivotally mounted thereon to swing laterally, an eye on one of the booms, a member on the other boom to receive said eye when the booms are brought into adjacent relationship, said eye and member being mounted on the respective booms equidistantly from their pivotal centers, a latch pivoted in said member and engageable with said eye, and releasable means for retaining said latch in engagement with said eye.

11. A wrecker comprising a frame, a pair of booms pivotally mounted thereon to swing toward and from adjacent relationship, a coupling member fixed to one of the booms, a cooperative coupling member fixed to the other boom in a position to receive the first-mentioned coupling member when the booms are brought into adjacent relationship, said members being disposed on the adjacent sides of the booms equidistantly from their pivotal centers, a locking latch pivoted on said cooperative coupling member to receive said first-mentioned coupling member and movable thereby into locking relation therewith by movement of the booms into adjacent relationship, and releasable means for holding said latch in locking position.

12. A wrecker according to claim 11, wherein said releasable holding means also bears frictionally against and yieldably holds said latch in a position to receive said first-mentioned coupling member.

13. A wrecker acocrding to claim 11, wherein said releasable latch holding means comprises a spring-actuated plunger which presses frictionally against a side of the latch to frictionally hold it in a position to receive said first-mentioned coupling member, and is movable by its spring into locking position by said first-mentioned coupling member.

14. A wrecker comprising a pair of hoisting booms pivotally mounted to swing laterally to and from adjacent relationship, an eye fixed to one of the booms adjacent to its outer end, a member fixed to the other boom adjacent to its outer end and having a slot therein to receive said eye when the booms are brought into adjacent relationship, said eye and member being disposed on the adjacent sides of the respective booms equidistantly from the pivotal centers thereof, a latch pivoted in said member in a position to project into the slot therein and having a notch to receive said eye when said latch is rocked into one position and movable by said eye into a position to retain it by relative movement of the booms into adjacent relationship, and a spring plunger mounted in a position to frictionally engage a side of the latch while in eye receiving position to yieldingly retain it in said position, and engageable with the latch to lock it in eye-retaining position after it has been moved into said position.

15. Hoisting apparatus comprising an upright mast having means for supporting it for rotation on its axis, a boom connected to the mast to rotate therewith and to swing laterally into different angular positions, power means for rotating the mast to swing the boom, including means for connecting and disconnecting the power means with respect to the mast, a pair of collars fixed to the mast one above the other, each collar having a cam thereon projecting toward the other collar, and means connected to said power connecting and disconnecting means and having a projection thereon engageable with one or the other of the cams by rotation of the mast to a predetermined extent in one or the other direction and operable to actuate said connecting and disconnecting means to disconnect the power means from the mast.

16. Hoisting apparatus comprising an upright mast having means for supporting it for rotation on its axis, a boom connected to the mast to rotate therewith and to swing laterally into different angular positions, power means including a clutch for rotating the mast to swing the boom, a pair of annular collars spaced axially of and fixed to the mast, a cam on each collar projecting into the space between the collars, and means having a projection thereon extending into the space between the collars and engageable by one or the other of said cams by rotation of the mast in one or the other direction and connected to said clutch to disconnect the power means from the mast.

17. Hoisting apparatus comprising an upright mast at least a portion of which is circular in cross-section, means for supporting the mast for rotation on its axis, a boom connected to the mast to rotate therewith and to swing laterally into different angular positions, power means including a clutch for rotating the mast, a pair of annular collars rotatably adjustable on said portion of the mast of circular cross-section and having means for fixing them in axially spaced relation thereon, a cam on each collar projecting into the space between the collars, and means including a projection extending into the space between the collars and engageable by one or the other of the cams by rotation of the mast in one or the other direction and connected to the clutch to disconnect the power means from the mast.

18. Hoisting apparatus comprising an upright mast having means for supporting it for rotation on its axis, a boom connected to the mast to rotate therewith and to swing into different angular positions, power means including worm gearing, a gear fixed to the mast and a pinion meshing therewith, and a clutch for connecting the worm gearing to the pinion to rotate the mast by power and for disconnecting the pinion from the worm gearing for swinging of the boom independently of the worm gearing.

19. Hoisting apparatus comprising an upright mast having means for supporting it for rotation on its axis, a boom connected to the mast for rotation therewith and to swing laterally into different angular positions, power means including a worm and a worm wheel driven thereby for rotating the mast, means for connecting and disconnecting the power means with respect to the mast, means including controlling devices on the mast rotatably adjustable about the axis of rotation of the mast and rotatable therewith in accordance with the swinging movements of the boom for automatically disconnecting the power means from the mast when the boom reaches a predetermined angle in its swing in either direction, and a manually controlled clutch interposed between the mast and said worm wheel for disconnecting the mast from said worm wheel to permit lateral swinging of the boom independently of the power means.

20. A wrecker comprising a frame, a pair of booms pivoted at the respective sides of the frame to swing laterally, an eye fixed to and extending inwardly from the inner side of one of the booms, a member rigidly fixed to the inner side of the other boom and having a recess therein positioned to receive the eye when the booms are brought together, a latch pivoted to the recessed member and having a projection thereon, the latch being engageable and movable by the eye to swing the projection on the latch into the eye and thereby couple the booms together, and means for frictionally holding the latch in position to receive the eye and permit swinging of the latch by the eye into coupling position, said holding means being engageable with the latch when the latter assumes coupling position to lock the latch in said position.

ERNEST W. HOLMES.
ERNEST W. HOLMES, JR.

REFERENCES CITED

The following references are of record in the file of this patent:

UNITED STATES PATENTS

| Number | Name | Date |
|---|---|---|
| 811,973 | Travis | Feb. 6, 1906 |
| 841,465 | Stauffer | Jan. 15, 1907 |
| 1,254,804 | Holmes | Jan. 29, 1918 |
| 1,468,950 | Krupp | Sept. 25, 1923 |
| 1,599,739 | Ball | Sept. 14, 1926 |
| 1,635,758 | Lemon | July 12, 1927 |
| 1,639,428 | Daly | Aug. 16, 1927 |

(Other references on following page)

UNITED STATES PATENTS

| Number | Name | Date |
|---|---|---|
| 1,851,695 | Dengler | Mar. 29, 1932 |
| 1,867,453 | Harding | July 12, 1932 |
| 1,869,747 | Howard | Aug. 2, 1932 |
| 2,012,414 | Adams | Aug. 27, 1935 |
| 2,053,157 | Ljungkull | Sept. 1, 1936 |
| 2,073,862 | Bendix et al. | Mar. 16, 1937 |
| 2,084,887 | Bennett | June 22, 1937 |
| 2,131,479 | McGiffert et al. | Sept. 27, 1938 |
| 2,162,962 | Messer | June 20, 1939 |
| 2,179,171 | Boho | Nov. 7, 1939 |
| 2,223,863 | Wunsch | Dec. 3, 1940 |
| 2,264,569 | Holmes | Dec. 2, 1941 |
| 2,301,782 | Lawler | Nov. 10, 1942 |
| 2,321,549 | Holmes | June 8, 1943 |
| 2,397,558 | Mennen | Apr. 2, 1946 |

FOREIGN PATENTS

| Number | Country | Date |
|---|---|---|
| 119,071 | Australia | Oct. 26, 1944 |